United States Patent
Hu et al.

(10) Patent No.: US 12,335,872 B2
(45) Date of Patent: Jun. 17, 2025

(54) COMMUNICATION METHOD AND APPARATUS

(71) Applicant: HUAWEI TECHNOLOGIES CO., LTD., Guangdong (CN)

(72) Inventors: Xingxing Hu, Shanghai (CN); Hongping Zhang, Shanghai (CN); Rui Wang, Shanghai (CN); Huiming Sun, Shanghai (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 352 days.

(21) Appl. No.: 17/887,510

(22) Filed: Aug. 15, 2022

(65) Prior Publication Data
US 2022/0394620 A1 Dec. 8, 2022

Related U.S. Application Data

(63) Continuation of application No. PCT/CN2021/076955, filed on Feb. 19, 2021.

(30) Foreign Application Priority Data

Feb. 21, 2020 (CN) .......................... 202010108253.6

(51) Int. Cl.
*H04W 52/02* (2009.01)
*H04W 28/082* (2023.01)
(Continued)

(52) U.S. Cl.
CPC ..... *H04W 52/0232* (2013.01); *H04W 28/082* (2023.05); *H04W 36/00698* (2023.05);
(Continued)

(58) Field of Classification Search
CPC ....... H04W 52/0232; H04W 36/00698; H04W 76/19; H04W 76/28; H04W 76/30;
(Continued)

(56) References Cited

U.S. PATENT DOCUMENTS

2019/0182881 A1* 6/2019 Teyeb ..................... H04L 5/001
2019/0254101 A1 8/2019 Lee et al.
(Continued)

FOREIGN PATENT DOCUMENTS

CN 104219787 A 12/2014
CN 110798867 A 2/2020
(Continued)

OTHER PUBLICATIONS

Lenovo et al., "General issues on SCG activation and deactivation", 3GPP TSG-RAN WG2 Meeting #113e R2-2101121, Jan. 15, 2021, total 5 pages.

(Continued)

*Primary Examiner* — Vinncelas Louis

(57) ABSTRACT

A communication method and apparatus are provided, to resolve a problem that a terminal device may fail to normally communicate with a network side when an SCG is suspended and a link problem occurs in an MCG or a signal quality of the MCG deteriorates, so that communication reliability is improved. The communication method and the apparatus are applicable to a communication system of any dual connectivity architecture, such as EN-DC, NGEN-DC, NE-DC and NR-DC. The method includes: When detecting that a link problem occurs in an MCG or signal quality of the MCG is less than a signal quality threshold, a terminal device resumes a suspended SCG, to resume communication between the terminal device and a network side. The MCG is managed by a master node, and the SCG is managed by a secondary node.

18 Claims, 6 Drawing Sheets

(51) Int. Cl.
*H04W 36/00* (2009.01)
*H04W 76/19* (2018.01)
*H04W 76/28* (2018.01)
*H04W 76/30* (2018.01)

(52) U.S. Cl.
CPC .......... *H04W 76/19* (2018.02); *H04W 76/28* (2018.02); *H04W 76/30* (2018.02)

(58) Field of Classification Search
CPC ..... H04W 76/22; H04W 76/34; H04W 76/27; H04W 76/15; H04W 36/0094; H04W 28/082; H04W 36/0016; Y02D 30/70; H04L 5/001
See application file for complete search history.

(56) References Cited

U.S. PATENT DOCUMENTS

| | | | |
|---|---|---|---|
| 2020/0059395 A1* | 2/2020 | Chen | H04W 28/082 |
| 2024/0056908 A1* | 2/2024 | Yang | H04W 36/0016 |

FOREIGN PATENT DOCUMENTS

| | | |
|---|---|---|
| EP | 3582541 A1 | 12/2019 |
| WO | 2018231021 A1 | 12/2018 |
| WO | 2019194715 A1 | 10/2019 |
| WO | 2020034949 A1 | 2/2020 |

OTHER PUBLICATIONS

Lenovo et al., "On SCG deactivation and activation", 3GPP TSG-RAN WG2 Meeting #112e R2-2009867, Oct. 23, 2020, total 3 pages.
3GPP TSG RAN WG2 Meeting #108, R2-1914364,Further discussion on suspension of SCG,Qualcomm Incorporated,Reno, Nevada, US, Nov. 18-22, 2019,total 10 pages.
3GPP TSG RAN WG2 Meeting #108, R2-1914576,Practical scoping of SCG suspension operation in NR,Intel Corporation,Reno, USA, Nov. 18-22, 2019 ,total 6 pages.
3GPP TSG-RAN WG2 #108 Tdoc R2-1915687,Open issues for suspended SCG behaviour,Ericsson,Reno, USA, Nov. 18-22, 2019,total 3 pages.
Ericsson, PCell failure handling for Standalone NR. 3GPP TSG-RAN WG2 #102, Busan, S. Korea, May 21-25, 2018, R2-1807038, 4 pages.

* cited by examiner

COMMUNICATION METHOD AND APPARATUS

CROSS-REFERENCE TO RELATED APPLICATIONS

This application is a continuation of International Patent Application No. PCT/CN2021/076955, filed on Feb. 19, 2021, which claims priority to Chinese Application No. 202010108253.6, filed on Feb. 21, 2020. The disclosures of the aforementioned applications are hereby incorporated by reference in their entireties.

TECHNICAL FIELD

This application relates to the communication field, and in particular, to a communication method and an apparatus.

BACKGROUND

In a dual connectivity (dual connectivity, DC, for example, multi-radio dual connectivity (MR-DC)) scenario, a terminal device may communicate with a plurality of access network devices. For example, the terminal device may simultaneously communicate with a master cell group (MCG) on a master node (MN) and a secondary cell group (SCG) on a secondary node (SN). Further, the SCG may be paused or suspended (store or suspend) when a small amount of data or no data is transmitted in the SCG or a required data rate is low, to reduce power consumption of the terminal device.

However, when the SCG for the terminal device is suspended, if the terminal device detects that a radio link problem occurs in the MCG, the terminal device initiates an RRC reestablishment (RRC reestablishment) process to resume the MCG, resulting in interruption of communication between the terminal device and a wireless network.

SUMMARY

Embodiments of this application provide a communication method and an apparatus, to resolve a problem that a terminal device may fail to normally communicate with a network side when an SCG is suspended and a link problem occurs in an MCG or signal quality of the MCG deteriorates, so that communication reliability is improved.

To achieve the foregoing objective, the following technical solutions are used in this application.

According to a first aspect, a communication method is provided. The method includes: When detecting that a link problem occurs in a master cell group MCG or signal quality of the MCG is less than a signal quality threshold, a terminal device resumes a suspended secondary cell group SCG. The MCG is managed by a master node, and the SCG is managed by a secondary node.

Based on the communication method provided in the first aspect, when the terminal device detects that the link problem occurs in the MCG or the signal quality of the MCG deteriorates, that is, when the terminal device learns that quality of communication with the master node in the MCG deteriorates, the terminal device may resume the suspended SCG, that is, resume communication between the terminal device and the secondary node in the SCG, to improve reliability of communication between the terminal device and a wireless network.

For example, corresponding to a implementation in which the terminal device suspends the SCG, that a terminal device resumes a suspended secondary cell group SCG may be implemented in one of the following manners: activating a part or all of deactivated cells in the SCG; waking up a part or all of cells that are in a dormant state in the SCG; stopping discontinuous reception (DRX) and/or discontinuous transmission (DTX) performed in a part or all of cells in the SCG; or resuming only signaling transmission in the SCG. In other words, the terminal device may resume transmission between the terminal device and only one cell suspended in the SCG, for example, a primary secondary cell, or may resume transmission between the terminal device and a plurality of cells suspended in the SCG, for example, a primary secondary cell and at least one secondary cell. For any resumed cell, resuming transmission between the terminal device and the cell may include: resuming only transmission between the terminal device and the cell on a signaling radio bearer, that is, resuming only signaling transmission; or resuming transmission between the terminal device and the cell on a signaling radio bearer and transmission between the terminal device and the cell on a data radio bearer, that is, resuming both signaling transmission and data transmission. An implementation in which the terminal device suspends and resumes the SCG is not limited in this embodiment of this application.

In an embodiment, that a terminal device resumes a suspended secondary cell group SCG may include: The terminal device resumes transmission with the SCG on a split signaling radio bearer SRB1 and/or a signaling radio bearer SRB3. In this way, the terminal device can actively resume signaling transmission with the secondary node, to improve communication reliability. Further, the terminal device may alternatively resume data transmission with the secondary node, for example, a data radio bearer DRB between the terminal device and the SCG.

It should be noted that a decision that the terminal device resumes the suspended SCG may be made by the terminal device, that is, the terminal device is an initiator of resuming the suspended SCG. For example, the terminal device may include a radio resource control (RRC) layer entity and a packet data convergence protocol (PDCP) layer entity. Optionally, the communication method in the first aspect may further include: The radio resource control RRC layer entity of the terminal device sends first indication information to the packet data convergence protocol PDCP layer entity of the terminal device. The first indication information indicates to resume the SCG.

Further, the communication method in the first aspect may further include: The terminal device sends second indication information to the master node via the secondary node. The second indication information is used to indicate the link problem occurring in the MCG or indicate that the link problem occurs in the MCG. In this way, the master node may resume the MCG based on the second indication information, for example, indicate the terminal device to perform a handover procedure or a reconfiguration procedure, to further improve the communication reliability.

Optionally, the communication method in the first aspect may further include: After the secondary node accepts a random access request initiated by the terminal device, the terminal device sends the second indication information to the master node via the secondary node.

For example, the second indication information may be included in a first message for transmission. The first message may be an MCG failure message, or another message including an MCG failure message. This is not limited in this embodiment of this application.

Optionally, the communication method in the first aspect may further include: The terminal device receives a response message for the first message from the master node via the secondary node. The response message for the first message may be an RRC reconfiguration message. The response message for the first message may be used to resume the MCG, to further improve the communication reliability. Optionally, the RRC reconfiguration message may be further used to indicate the terminal device to suspend the SCG, to reduce power consumption of the terminal device.

Alternatively, optionally, the response message for the first message may be an RRC release message. The response message for the first message may alternatively be used to release an RRC connection, to notify the terminal device that a network side cannot resume the MCG. The RRC connection is released, so that the power consumption of the terminal device is reduced.

In an embodiment, the communication method in the first aspect may further include: After it is detected that the link problem occurs in the MCG or the signal quality of the MCG is less than the signal quality threshold, the terminal device determines that a maximum transmit power used by the terminal device to send a signal to the SCG is a first maximum transmit power. The first maximum transmit power is greater than a second maximum transmit power, and the second maximum transmit power is a maximum transmit power used by the terminal device to send a signal to the SCG before the SCG is suspended. In other words, the terminal device may send a signal, for example, a random access request and the first message, to the SCG at a transmit power as large as possible, to resume the SCG as soon as possible, so as to further improve the communication reliability.

In another embodiment, the communication method in the first aspect may further include: The terminal device sends a signal to the SCG in a first time period. The first time period includes a time period in which the terminal device sends a signal to the MCG based on a time division multiplexing pattern between the MCG and the SCG and a time period in which the terminal device sends a signal to the SCG based on the time division multiplexing pattern. In other words, the terminal device may not need to consider a limitation of time division multiplexing between the MCG and the SCG. The terminal device may send a signal to the SCG in all time periods originally used to send a signal to the MCG and the SCG, to resume the SCG as soon as possible, so as to further improve the communication reliability.

Optionally, that the terminal device sends a signal to the SCG in a first time period may include: The terminal device sends the signal to the SCG from a first moment. The first moment is an earliest sending moment in a plurality of sending moments in the first time period. In this way, the terminal device may send the signal to the SCG at the earliest sending moment, to resume the SCG as soon as possible, so as to further improve the communication reliability.

It should be noted that a solution of the maximum transmit power and a solution of the first time period may be implemented independently, or may be used in combination. For example, the terminal device may send a signal to the SCG at the plurality of sending moments in the first time period by using the first maximum transmit power. The plurality of sending moments in the first time period may include the first moment.

According to a second aspect, a communication method is provided. The method includes: A secondary node resumes, for a terminal device, a suspended secondary cell group SCG. The secondary node is configured to manage the SCG.

In an embodiment, that a secondary node resumes, for a terminal device, a suspended secondary cell group SCG may include: The secondary node resumes transmission between the terminal device and the SCG on a split signaling radio bearer SRB1 and/or a signaling radio bearer SRB3.

Optionally, the communication method in the second aspect may further include: The secondary node accepts a random access request initiated by the terminal device. The random access request is used to resume the SCG.

In an embodiment, the communication method in the second aspect may further include: The secondary node receives second indication information from the terminal device, and sends the second indication information to a master node. The master node is configured to manage a master cell group MCG for the terminal device, and the second indication information is used to indicate a link problem occurring in the MCG or indicate that a link problem occurs in the MCG.

Optionally, the second indication information may be included in a first message for transmission. The first message may be an MCG failure message, or another message including an MCG failure message. This is not limited in this embodiment of this application.

Further, the communication method in the second aspect may further include: The secondary node receives a response message for the first message from the master node, and sends the response message for the first message to the terminal device. The response message for the first message may be an RRC reconfiguration message or an RRC release message. Optionally, the RRC reconfiguration message may be further used to indicate the terminal device to suspend the SCG.

In an embodiment, the communication method in the second aspect may further include: The secondary node receives a signal from the terminal device in a first time period. The first time period may include a time period in which the terminal device sends a signal to the MCG based on a time division multiplexing pattern between the MCG and the SCG and a time period in which the terminal device sends a signal to the SCG based on the time division multiplexing pattern.

Optionally, that the secondary node receives a signal from the terminal device in a first time period may include: The secondary node receives the signal from the terminal device from a first moment. The first moment is an earliest sending moment in a plurality of sending moments in the first time period.

In addition, for a technical effect of the communication method in the second aspect, refer to the technical effect of the communication method in the first aspect. Details are not described herein again.

According to a third aspect, a communication method is provided. The method includes: A master node receives second indication information from a terminal device by using a secondary node. The master node is configured to manage a master cell group MCG, the secondary node is configured to manage a secondary cell group SCG, and the second indication information is used to indicate a link problem occurring in the MCG or indicate that a link problem occurs in the MCG. Then, the master node resumes the MCG.

For example, the second indication information may be included in a first message for transmission. The first message may be an MCG failure message, or another message including an MCG failure message. This is not limited in this embodiment of this application.

Further, the communication method in the third aspect may further include: The master node sends a response message for the first message to the terminal device via the secondary node. The response message for the first message may be an RRC reconfiguration message or an RRC release message.

Still further, the RRC reconfiguration message may be used to indicate the terminal device to suspend the SCG.

In an embodiment, the communication method in the third aspect may further include: The master node receives a signal from the terminal device in a first time period via the secondary node. The first time period may include a time period in which the terminal device sends a signal to the MCG based on a time division multiplexing pattern between the MCG and the SCG and a time period in which the terminal device sends a signal to the SCG based on the time division multiplexing pattern.

In addition, for a technical effect of the communication method in the third aspect, refer to the technical effect of the communication method in the first aspect. Details are not described herein again.

According to a fourth aspect, a communication apparatus is provided. The communication apparatus includes a processing module and a transceiver module. The processing module is configured to: when controlling the transceiver module to detect that a link problem occurs in a master cell group MCG or signal quality of the MCG is less than a signal quality threshold, resume a suspended secondary cell group SCG. The MCG is managed by a master node, and the SCG is managed by a secondary node.

In an embodiment, the processing module is further configured to resume transmission with the SCG on a split signaling radio bearer SRB1 and/or a signaling radio bearer SRB3.

For example, the processing module may include a radio resource control RRC layer entity and a packet data convergence protocol PDCP layer entity. Optionally, the RRC layer entity is configured to send first indication information to the PDCP layer entity. The first indication information indicates to resume the SCG.

Further, the transceiver module is further configured to send second indication information to the master node via the secondary node. The second indication information is used to indicate the link problem occurring in the MCG or indicate that the link problem occurs in the MCG.

Optionally, the transceiver module is further configured to: after the secondary node accepts a random access request initiated by the communication apparatus in the fourth aspect, send the second indication information to the master node via the secondary node.

For example, the second indication information may be included in a first message for transmission. The first message may be an MCG failure message, or another message including an MCG failure message.

Optionally, the transceiver module is further configured to receive a response message for the first message from the master node via the secondary node. The response message for the first message may be an RRC reconfiguration message or an RRC release message. Optionally, the RRC reconfiguration message may be used to indicate the terminal device to suspend the SCG.

In an embodiment, the processing module is further configured to: after it is detected that the link problem occurs in the MCG or the signal quality of the MCG is less than the signal quality threshold, determine that a maximum transmit power used by the communication apparatus to send a signal to the SCG is a first maximum transmit power. The first maximum transmit power is greater than a second maximum transmit power, and the second maximum transmit power is a maximum transmit power used by the communication apparatus to send a signal to the SCG before the SCG is suspended.

In an embodiment, the transceiver module is further configured to send a signal to the SCG in a first time period. The first time period includes a time period in which the communication apparatus sends a signal to the MCG based on a time division multiplexing pattern between the MCG and the SCG and a time period in which the communication apparatus sends a signal to the SCG based on the time division multiplexing pattern.

Optionally, the transceiver module is further configured to send the signal to the SCG from a first moment. The first moment is an earliest sending moment in a plurality of sending moments in the first time period.

It should be noted that a solution of the first maximum transmit power and a solution of the first time period may be implemented independently, or may be implemented in combination. For example, the transceiver module may send the signal to the SCG at the plurality of sending moments in the first time period by using the first maximum transmit power. The plurality of sending moments in the first time period may include the first moment.

Optionally, the communication apparatus in the fourth aspect may further include a storage module, and the storage module stores a program or instructions. When the processing module executes the program or the instructions, the communication apparatus in the fourth aspect is enabled to perform the communication method in the first aspect.

It should be noted that the communication apparatus in the fourth aspect may be a terminal device, or may be a chip (system) that can be disposed in the terminal device, or another component that has a function of the terminal device. This is not limited in this application.

In addition, for a technical effect of the communication apparatus in the fourth aspect, refer to the technical effect of the communication method in the first aspect. Details are not described herein again.

According to a fifth aspect, a communication apparatus is provided. The communication apparatus is configured to manage an SCG, and includes a processing module and a transceiver module. The processing module is configured to control the transceiver module to interact with a terminal device, to resume the suspended SCG for the terminal device.

In an embodiment, the processing module is further configured to resume transmission between the terminal device and the SCG on a split signaling radio bearer SRB1 and/or a signaling radio bearer SRB3.

Optionally, the transceiver module is further configured to accept a random access request initiated by the terminal device. The random access request is used to resume the SCG.

In an embodiment, the transceiver module is further configured to receive second indication information from the terminal device, and send the second indication information to a master node. The master node is configured to manage a master cell group MCG for the terminal device, and the second indication information is used to indicate a link problem occurring in the MCG or indicate that a link problem occurs in the MCG.

Optionally, the second indication information may be included in a first message for transmission. The first message may be an MCG failure message, or another message including an MCG failure message.

Further, the transceiver module is further configured to receive a response message for the first message from the master node, and send the response message for the first message to the terminal device. The response message for the first message may be an RRC reconfiguration message or an RRC release message. The RRC reconfiguration message is used to indicate the terminal device to resume the MCG, and the RRC release message is used to indicate the terminal device to release an RRC connection. Optionally, the RRC reconfiguration message may be further used to indicate the terminal device to suspend the SCG.

In an embodiment, the transceiver module is further configured to receive a signal from the terminal device in a first time period. The first time period includes a time period in which the terminal device sends a signal to the MCG based on a time division multiplexing pattern between the MCG and the SCG and a time period in which the terminal device sends a signal to the SCG based on the time division multiplexing pattern.

Optionally, the transceiver module is further configured to receive the signal from the terminal device from a first moment. The first moment is an earliest sending moment in a plurality of sending moments in the first time period.

Optionally, the communication apparatus in the fifth aspect may further include a storage module, and the storage module stores a program or instructions. When the processing module executes the program or the instructions, the communication apparatus in the fifth aspect is enabled to perform the communication method in the second aspect.

It should be noted that the communication apparatus in the fifth aspect may be a secondary node, or may be a chip (system) that can be disposed in the secondary node, or another component that has a function of the secondary node. This is not limited in this application.

In addition, for a technical effect of the communication apparatus in the fifth aspect, refer to the technical effect of the communication method in the first aspect. Details are not described herein again.

According to a sixth aspect, a communication apparatus is provided. The communication apparatus is configured to manage a master cell group MCG. The communication apparatus includes a processing module and a transceiver module. The transceiver module is configured to receive second indication information from a terminal device by using a secondary node. The secondary node is configured to manage a secondary cell group SCG, and the second indication information is used to indicate a link problem occurring in the MCG or indicate that a link problem occurs in the MCG. The processing module is configured to resume the MCG.

Optionally, the second indication information may be included in a first message for transmission. The first message may be an MCG failure message, or another message including an MCG failure message. This is not limited in this embodiment of this application.

Further, the transceiver module is further configured to send a response message for the first message to the terminal device via the secondary node. The response message for the first message is an RRC reconfiguration message or an RRC release message. The RRC reconfiguration message is used to indicate the terminal device to resume the MCG, and the RRC release message is used to indicate the terminal device to release an RRC connection. Optionally, the RRC reconfiguration message may be further used to indicate the terminal device to suspend the SCG.

In an embodiment, the transceiver module is further configured to receive a signal from the terminal device in a first time period via the secondary node. The first time period includes a time period in which the terminal device sends a signal to the MCG based on a time division multiplexing pattern between the MCG and the SCG and a time period in which the terminal device sends a signal to the SCG based on the time division multiplexing pattern.

Optionally, the communication apparatus in the sixth aspect may further include a storage module, and the storage module stores a program or instructions. When the processing module executes the program or the instructions, the communication apparatus in the sixth aspect is enabled to perform the communication method in the third aspect.

It should be noted that the communication apparatus in the sixth aspect may be a master node, or may be a chip (system) that can be disposed in the master node, or another component that has a function of the master node. This is not limited in this application.

In addition, for a technical effect of the communication apparatus in the sixth aspect, refer to the technical effect of the communication method in the first aspect. Details are not described herein again.

According to a seventh aspect, a communication apparatus is provided. The communication apparatus is configured to perform the communication method according to any one of the implementations of the first aspect to the third aspect.

According to an eighth aspect, a communication apparatus is provided. The communication apparatus includes a processor. The processor is configured to perform the communication method according to any one of the implementations of the first aspect to the third aspect.

According to a ninth aspect, a communication apparatus is provided. The communication apparatus includes a processor, and the processor is coupled to a memory. The memory is configured to store a computer program. The processor is configured to execute the computer program stored in the memory, to enable the communication apparatus to perform the communication method according to any one of the implementations of the first aspect to the third aspect.

In an embodiment, the communication apparatus in the ninth aspect may further include a transceiver. The transceiver may be a transceiver circuit or an input/output interface. The transceiver may be used by the communication apparatus to communicate with another communication apparatus.

In this application, the communication apparatus in the ninth aspect may be a terminal device, a secondary node, or a master node, or a chip (system) or another component that can be disposed in the terminal device, the secondary node, or the master node.

For technical effects of the communication apparatuses in the seventh aspect to the ninth aspect, refer to the technical effects of the communication methods in the first aspect to the third aspect. Details are not described herein again.

According to a tenth aspect, a chip system is provided. The chip system includes a processor and an input/output port. The processor is configured to implement a processing function in the first aspect to the third aspect, and the input/output port is configured to implement a transceiver function in the first aspect to the third aspect.

In an embodiment, the chip system further includes a memory. The memory is configured to store program instructions and data for implementing a function in the first aspect to the third aspect.

The chip system may include a chip, or may include a chip and another discrete component.

According to an eleventh aspect, a communication system supporting dual connectivity is provided. The communication system includes a terminal device, a secondary node, and a master node.

According to a twelfth aspect, a computer-readable storage medium is provided. The computer-readable storage medium includes a computer program or instructions. When the computer program or the instructions is/are run on a computer, the computer is enabled to perform the communication method according to any one of the implementations of the first aspect to the third aspect.

According to a thirteenth aspect, a computer program product is provided. The computer program product includes a computer program or instructions. When the computer program or the instructions is/are run on a computer, the computer is enabled to perform the communication method according to any one of the implementations of the first aspect to the third aspect.

DESCRIPTION OF EMBODIMENTS

The following describes technical solutions of this application with reference to the accompanying drawings.

The technical solutions in embodiments of this application may be applied to various communication systems supporting dual connectivity, for example, a wireless fidelity (Wi-Fi) system, a vehicle-to-everything (V2X) communication system, a device-to-device (dD2D) communication system, an Internet of Vehicles communication system, a 4th generation (4G) mobile communication system such as a long term evolution (LTE) system, a worldwide interoperability for microwave access (WiMAX) communication system, a 5th generation (5G) mobile communication system such as a new radio (NR) system, and a future communication system such as a 6th generation (6G) mobile communication system.

All aspects, embodiments, or features are presented in this application by describing a system that may include a plurality of devices, components, modules, and the like. It should be appreciated and understood that, each system may include another device, component, module, and the like, and/or may not include all devices, components, modules, and the like discussed with reference to the accompanying drawings. In addition, a combination of these solutions may be used.

In addition, in embodiments of this application, the word "for example" or "such as" is used to represent giving an example, an illustration, or a description. Any embodiment or design scheme described as an "example" in this application should not be understood as being more preferred or having more advantages than another embodiment or design scheme. Instead, the word "for example" is intended to present a concept.

In embodiments of this application, "information", "signal", "message", "channel", and "signaling" may sometimes be interchangeably used. It should be noted that expressed meanings are consistent when differences are not emphasized. "Of", "corresponding (corresponding, relevant)", and "corresponding" may sometimes be interchangeably used. It should be noted that expressed meanings are consistent when differences are not emphasized.

In embodiments of this application, sometimes a subscript, for example, $W_1$, may be written in an incorrect form, for example, $W_1$. Expressed meanings are consistent when differences are not emphasized.

A network architecture and a service scenario that are described in this embodiment of this application are intended to describe the technical solutions in embodiments of this application more clearly, and do not constitute a limitation on the technical solutions provided in embodiments of this application. A person of ordinary skill in the art may know that, with evolution of the network architecture and emergence of new service scenarios, the technical solutions provided in embodiments of this application are also applicable to similar technical problems.

Figure 1:
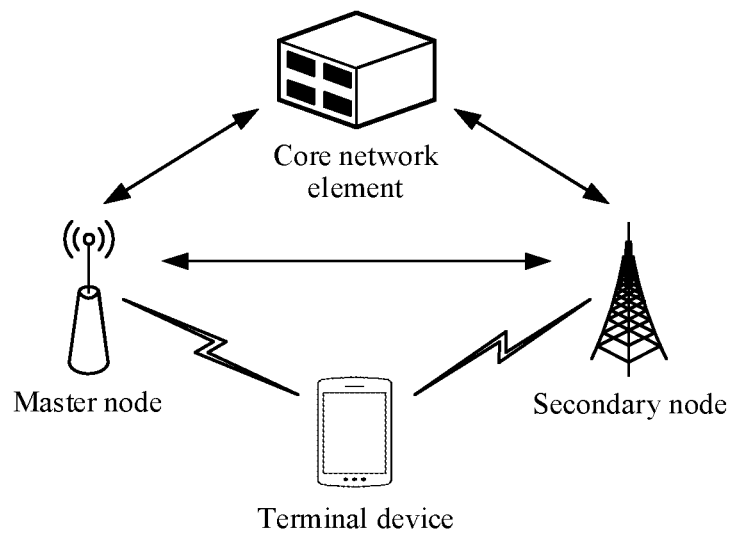
FIG. 1 is a diagram of an architecture of a communication system supporting dual connectivity according to an embodiment of this application.

FIG. 1 is a diagram of an architecture of a communication system that supports dual connectivity and that is applicable to a communication method provided in an embodiment of this application. For ease of understanding embodiments of this application, the communication system shown in FIG. 1 is first used as an example to describe in detail a communication system applicable to embodiments of this application. It should be noted that the solutions in embodiments of this application may also be applied to another mobile communication system, and a corresponding name may also be replaced with a name of a corresponding function in the another mobile communication system.

As shown in FIG. 1, the communication system includes a terminal device, a master node, a secondary node, and a core network including one or more core network elements.

There may be a wireless connection between the terminal device and each of the master node and the secondary node, that is, a wireless network may communicate with the terminal device in a dual connectivity manner, to provide high-rate data transmission for the terminal device. Based on communication standards separately supported by the master node and the secondary node, dual connectivity may be implemented in a plurality of manners. The following uses examples for description.

EN-DC (E-UTRA-NR dual connectivity): A terminal device is connected to an evolved NodeB (eNB) that serves as a master node and that is in an LTE standard and a gNodeB (gNodeB, gNB) that serves as a secondary node and that is in an NR standard. The master node is an eNB connected to a 4th core network (4th CN), for example, an evolved packet core (EPC).

NGEN-DC (next generation E-UTRA-NR dual connectivity): A terminal device is connected to an evolved NodeB (eNB) that serves as a master node and that is in an LTE standard and a gNodeB (gNB) that serves as a secondary node and that is in an NR standard. The master node is an eNB connected to a 5th generation core network (5GC), and the master node may also be referred to as a next generation evolved NodeB (ng-eNB).

NE-DC (NR-E-UTRA dual connectivity): A terminal device is connected to a gNB serving as a master node and an eNB that serves as a secondary node and that is in an LTE standard. The master node is a gNB connected to a 5GC. The secondary node is an eNB that provides data transmission between the terminal device and the 5GC, and is also referred to as an ng-eNB.

NR-DC (NR-NR dual connectivity): A terminal device is connected to a gNB that serves as a master node and that is in an NR standard and a gNB that serves as a secondary node and that is in the NR standard. The master node is a gNB connected to a 5GC.

It should be understood that dual connectivity may alternatively be implemented in other manners, and the manners are not listed one by one in this embodiment of this application.

Figure 2:
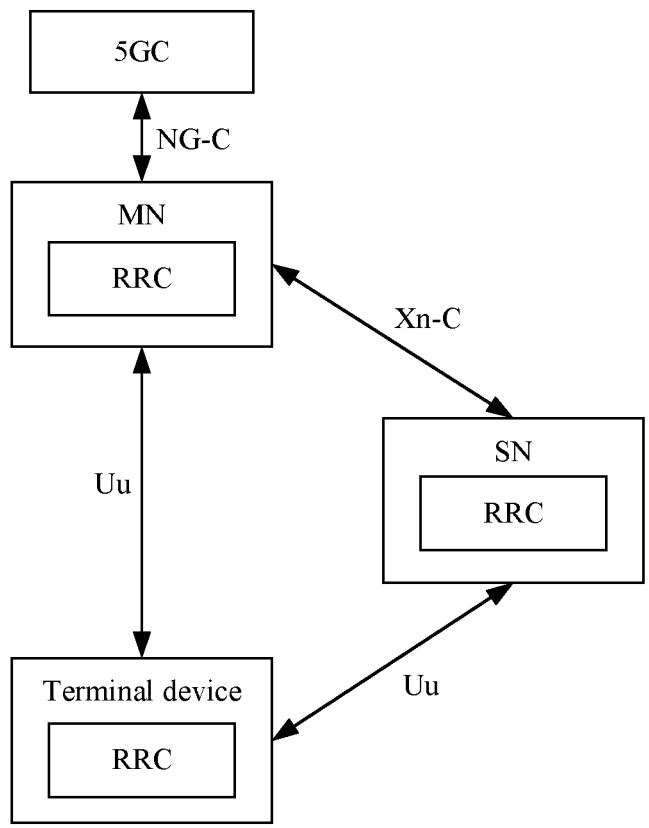
FIG. 2 is a diagram of a control plane architecture of a communication system supporting dual connectivity according to an embodiment of this application.

For example, FIG. 2 is a diagram of a control plane (CP) architecture of a communication system supporting dual connectivity according to an embodiment of this application. As shown in FIG. 2, in dual connectivity, a node that directly exchanges control plane signaling with a core network (through an NG-C interface) is referred to as a master node (there is usually one master node), and a node that does not directly exchange control plane signaling with the core network is referred to as a secondary node (there may be one or more secondary nodes, and only one secondary node is shown in FIG. 2). It should be understood that the secondary node may indirectly exchange control plane signaling with the core network by exchanging control plane signaling with the master node, for example, through an Xn-C interface. In other words, the control plane signaling between the secondary node and the core network may be forwarded by the master node.

It should be understood that the diagram of the control plane architecture of the communication system supporting dual connectivity shown in FIG. 2 is described by using an example in which the core network is a 5GC, and an interface between the master node and the secondary node is an Xn interface. Optionally, the core network shown in FIG. 2 may alternatively be a 4G core network, for example, an EPC in an LTE system. In this case, the control plane signaling between the master node and the core network may be exchanged through an S1-C interface. Optionally, the interface between the master node and the secondary node may alternatively be an X2 interface. In this case, the control plane signaling between the secondary node and the master node may be exchanged through an X2-C interface. An implementation of the core network and an implementation of the interface between the master node and the secondary node are not limited in this embodiment of this application.

In addition, control plane signaling between a terminal device and the master node and control plane signaling between the terminal device and the secondary node may be exchanged through a Uu interface. As shown in FIG. 2, in dual connectivity, each of the master node and the secondary node has a radio resource control (RRC) layer entity, and both the radio resource control layer entities can generate control plane signaling, namely, various RRC messages, for example, an RRC establishment/reestablishment message, an RRC configuration/reconfiguration message, an RRC release message, and a measurement request message. The master node may directly send, to the terminal device through the Uu interface, an RRC message generated by the master node. Optionally, the secondary node may directly send, to the terminal device through the Uu interface, an RRC message generated by the secondary node. It should be understood that, in this case, the terminal device may also directly send, to the secondary node through the Uu interface, an RRC message generated by the terminal device, for example, an RRC establishment/reestablishment complete message, an RRC configuration/reconfiguration complete message, or a measurement report. Alternatively, optionally, the secondary node may first send, to the master node through the control plane interface between the secondary node and the master node, for example, the Xn-C interface or the X2-C interface, the RRC message generated by the secondary node, and then the master node sends the RRC message to the terminal device through the Uu interface. The RRC message directly transmitted between the secondary node and the terminal device is carried on a signaling radio bearer (SRB)3. A manner of exchanging the control plane signaling between the secondary node and the terminal device is not limited in this embodiment of this application.

Further, in addition to the foregoing control plane signaling exchange, user plane (UP) data (data) is further exchanged between the master node and the core network and between the master node and the secondary node. Optionally, user plane data may also be exchanged between the secondary node and the core network. The following uses an example for description.

Figure 3:
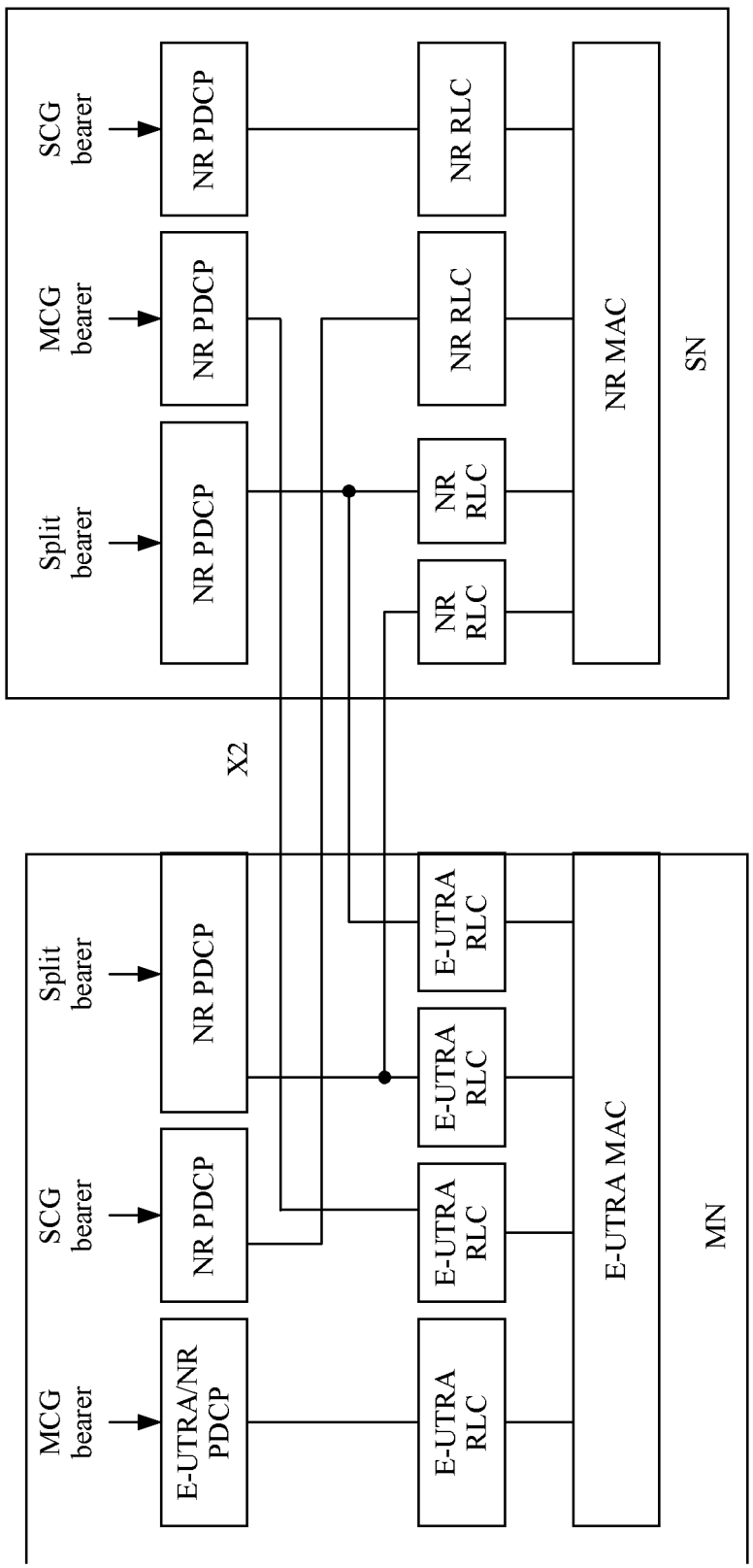
FIG. 3 is a diagram 1 of a user plane architecture of a communication system supporting dual connectivity according to an embodiment of this application.

For example, FIG. 3 is a diagram 1 of a user plane architecture of a communication system supporting dual connectivity according to an embodiment of this application. The user plane architecture is applicable to the foregoing EN-DC dual connectivity architecture. As shown in FIG. 3, each of a master node and a secondary node has a plurality of radio link control (radio link control, RLC) layer entities and a media access control (media access control, MAC) layer entity, and a data radio bearer (data radio bearer, DRB) in dual connectivity may include one or more of an MCG bearer (MCG bearer), an SCG bearer (SCG bearer), and a split bearer (split bearer). The MCG bearer means that an RLC layer entity and a MAC layer entity of the DRB exist on only the master node. The SCG bearer means that the RLC layer entity and the MAC layer entity of the DRB exist on only the secondary node. The split bearer means that the RLC layer entity and the MAC layer entity of the DRB exist on both the master node and the secondary node. In addition, a bearer whose PDCP is terminated on the master node is referred to as a master node terminated (MN terminated) bearer. Downlink (DL) data directly reaches the master node from a core network, is processed by a PDCP layer entity of the master node, then is processed by the RLC layer entity and the MAC layer entity of the master node and/or the RLC layer entity and the MAC layer entity of the secondary node, and is sent to a terminal device. Correspondingly, uplink (UL) data reaches the master node and/or the secondary node from the terminal device, is processed by the PDCP layer entity of the master node, and is sent to the core network. Similarly, a bearer whose PDCP is terminated on the secondary node is referred to as a secondary node terminated (SN terminated) bearer. Downlink data directly reaches the secondary node from the core network, is processed by a PDCP layer entity of the secondary node, then is processed by the RLC layer entity and the MAC layer entity of the master node and/or the RLC layer entity and the MAC layer entity of the secondary node, and is sent to the terminal device. Correspondingly, uplink data reaches the master node and/or the secondary node from the terminal device, is processed by the PDCP layer entity of the secondary node, and is sent to the core network.

Figure 4:
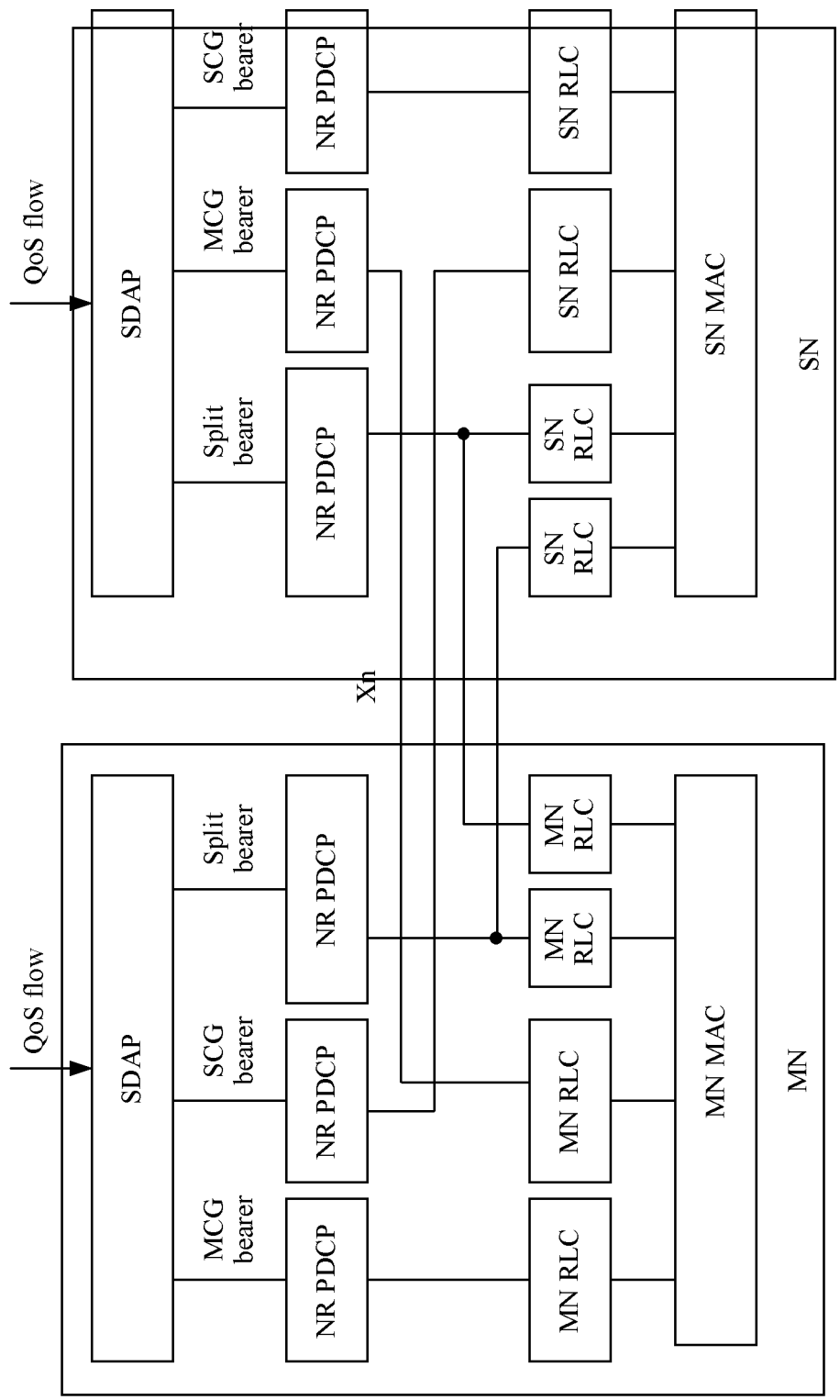
FIG. 4 is a diagram 2 of a user plane architecture of a communication system supporting dual connectivity according to an embodiment of this application.

For example, FIG. 4 is a diagram 2 of a user plane architecture of a communication system supporting dual connectivity according to an embodiment of this application. The user plane architecture is applicable to the foregoing NGEN-DC dual connectivity architecture, the NE-DC dual connectivity architecture, and the NR-DC dual connectivity architecture, that is, a dual connectivity architecture in which a core network is a 5GC. Refer to FIG. 3. As shown in FIG. 4, in addition to the foregoing protocol layer entities, each of a master node and a secondary node further includes a service data adaptation protocol (SDAP) layer entity. The SDAP layer entity is configured to: when the master node or the secondary node exchanges data with the core network, map a quality of service (QoS) flow (QoS flow) of the core network to each of the foregoing DRBs, and send the QoS flow to a terminal device; or map data carried on each of the foregoing DRBs to a QoS flow, and send the QoS flow to the core network. For the mapping between the QoS flow and the DRB, refer to an existing implementation. Details are not described in this embodiment of this application.

In addition, for a terminal device in dual connectivity, a user plane of a secondary node may be connected to a core network connected to a master node, that is, the core network may exchange data with the terminal device via the secondary node.

In dual connectivity, a master node includes a primary cell (PCell), and a secondary node includes a primary secondary cell (PSCell). The primary cell is a cell that is deployed on a primary frequency and that is accessed by a terminal device when the terminal device initiates an initial connection establishment process or an RRC connection reestablishment process, or a cell that is indicated as the primary cell in a handover process. The primary secondary cell may be a cell accessed by the terminal device when the terminal device initiates a random access process to the secondary node, a cell that is on another secondary node and to which the terminal device initiates data transmission when the terminal device skips the random access process in a secondary node change process, or a cell on a secondary node accessed by the terminal device when the terminal device initiates the random access process when performing a synchronization reconfiguration process. For ease of description, in an NR protocol, the primary cell and the primary secondary cell are collectively referred to as a special cell (SpCell).

Further, in addition to the primary cell, the master node may further include one or more secondary cells (SCells). Similarly, in addition to the primary secondary cell, the secondary node may further include one or more secondary cells. A cell that is on the master node and that serves the terminal device, for example, the master cell or the secondary cell on the master node, may be collectively referred to as an MCG. Similarly, a cell that is on the secondary node and that serves the terminal device, for example, the primary secondary cell or the secondary cell on the secondary node, may be collectively referred to as an SCG. In each of the foregoing cell groups, the special cell and the secondary cell may jointly provide a transmission resource for the terminal device in a carrier aggregation (CA) manner.

In addition, for a terminal device in a connected mode (RRC_CONNECTED), a cell that serves the terminal device is referred to as a serving cell. It should be understood that for a terminal device for which DC and CA are not configured, a serving cell set of the terminal device includes only a primary cell, that is, the terminal device has only one serving cell. For a terminal device for which the DC and CA are configured, a serving cell set of the terminal device may include the foregoing special cell and the secondary cell, that is, the terminal device has a plurality of serving cells. Each cell corresponds to one component carrier (CC).

The master node and the secondary node may also be collectively referred to as a radio access network (RAN) device, a radio access network element, or a base station, and are a device that is located on a network side of the communication system and that has a wireless transceiver function, a chip (system) that can be disposed in the device, or another component that has a function of an access network device. The access network device includes but is not limited to: an access point (AP) in a wireless fidelity (Wi-Fi) system, such as a home gateway, a router, a server, a switch, and a bridge, an evolved NodeB (eNB), a radio network controller (radio network controller, RNC), a NodeB (NodeB, NB), a base station controller (base station controller, BSC), a base transceiver station (BTS), a home base station (for example, a home evolved NodeB, or a home NodeB, HNB), a baseband unit (BBU), a wireless relay node, a wireless backhaul node, a transmission point (transmission reception point, TRP, or transmission point, TP), or the like. The access network device may alternatively be a gNB or a transmission point (TRP or TP) in a 5G system, for example, a new radio (NR) system, or one antenna panel or a group of antenna panels (including a plurality of antenna panels) of a base station in a 5G system. The access network device may alternatively be a network node, such as a baseband unit (BBU), a distributed unit (DU), or a road side unit (RSU) having a base station function, that constitutes a gNB or a transmission point.

The terminal device is a terminal that accesses the foregoing communication system and that has a wireless transceiver function, a chip (system) that can be disposed in the device, or another component that has a terminal function. The terminal device may also be referred to as a user apparatus, an access terminal, a subscriber unit, a subscriber station, a mobile station, a remote station, a remote terminal, a mobile device, a user terminal, a terminal, a wireless communication device, a user agent, or a user apparatus. The terminal device in embodiments of this application may be a mobile phone, a tablet (Pad), a computer having a wireless transceiver function, a virtual reality (VR) terminal device, an augmented reality (AR) terminal device, a wireless terminal in industrial control, a wireless terminal in self driving, a wireless terminal in remote medical, a wireless terminal in a smart grid (smart grid), a wireless terminal in transportation safety, a wireless terminal in a smart city, a wireless terminal in a smart home, a vehicle-mounted terminal, an RSU that has a terminal function, or the like. The terminal device in this application may alternatively be a vehicle-mounted module, a vehicle-mounted component, a vehicle-mounted chip, or a vehicle-mounted unit that is disposed in a vehicle as one or more components or units. The vehicle uses, the vehicle-mounted module, the vehicle-mounted component, the vehicle-mounted chip, or the vehicle-mounted unit that is disposed in the vehicle, to implement the communication method provided in this application.

The core network element is also referred to as a core network device, is a device in a core network (CN) that provides service support for the terminal device, and includes but is not limited to an access and mobility management function (AMF) network element, a session management function (SMF) network element, a user plane function (UPF) network element, and the like. The AMF network element may be responsible for access management and mobility management of the terminal device. The SMF network element may be responsible for session management, such as session establishment and modification. The UPF network element may be a user plane function entity, and is mainly responsible for obtaining data from an external network, for example, a data network (DN).

It should be noted that the network element in this application may also be referred to as an entity or a function entity. For example, the AMF network element may also be referred to as an AMF entity or an AMF function entity. For another example, the SMF network element may also be referred to as an SMF entity, an SMF function entity, or the like.

It should be noted that the communication method provided in this embodiment of this application is applicable to communication between the terminal device and the secondary node and/or the master node and communication between the secondary node and the master node shown in FIG. 1.

It should be understood that FIG. 1 to FIG. 4 are only simplified diagrams of examples for ease of understanding. The communication system may further include another network device and/or another terminal device, which are/is not shown in FIG. 1 to FIG. 4.

Figure 5:
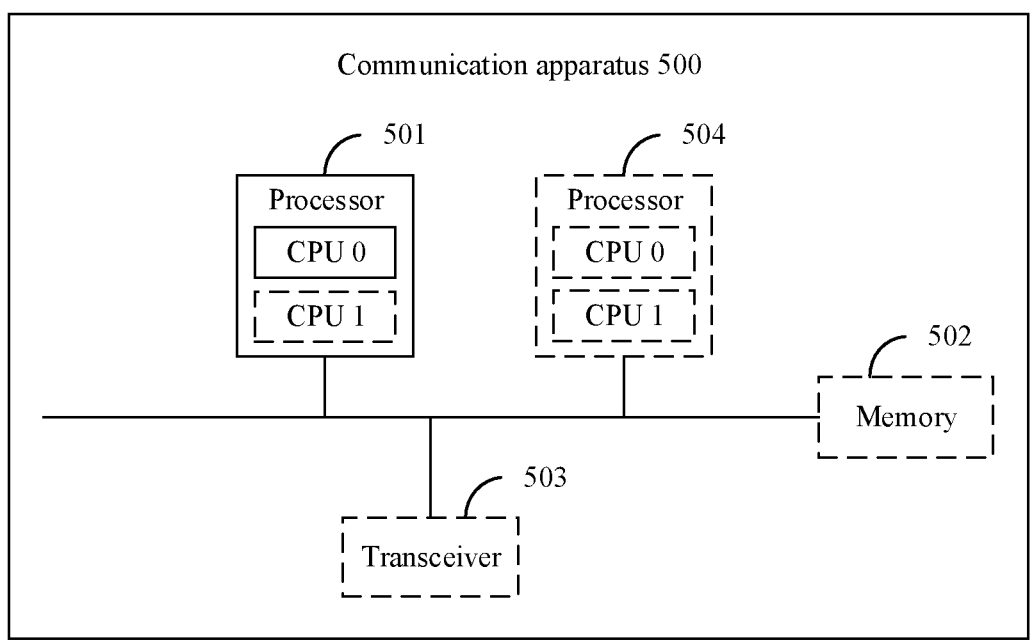
FIG. 5 is a diagram 1 of a communication apparatus according to an embodiment of this application.

For example, FIG. 5 is a diagram 1 of a communication apparatus according to an embodiment of this application. The communication apparatus may be a terminal device, a secondary node, or a master node, or may be a chip (system) or another component that can be used in the terminal device, the secondary node, or the master node.

As shown in FIG. 5, the communication apparatus 500 may include a processor 501. Optionally, the communication apparatus 500 may further include a memory 502 and/or a transceiver 503. The processor 501 may be coupled to the memory 502 and/or the transceiver 503, for example, there is an electrical-signal connection between the processor 501 and the memory 502 and/or the transceiver 503.

The following describes each component of the communication apparatus 500 in detail with reference to FIG. 5.

The processor 501 is a control center of the communication apparatus 500, and may be one processor or may be a collective term of a plurality of processing elements. For example, the processor 501 may be one or more central processing units (CPUs), or an application-specific integrated circuit (ASIC), or may be configured as one or more integrated circuits implementing embodiments of this application, for example, one or more microprocessors (DSPs) or one or more field programmable gate arrays (FPGAs).

The processor 501 may execute various functions of the communication apparatus 500 by running or executing a software program stored in the memory 502 and invoking data stored in the memory 502.

During implementation, in an embodiment, the processor 501 may include one or more CPUs, for example, a CPU 0 and a CPU 1 shown in FIG. 5.

During implementation, in an embodiment, the communication apparatus 500 may alternatively include a plurality of processors, for example, the processor 501 and a processor 504 shown in FIG. 5. Each of the processors may be a single-core processor (single-CPU) or may be a multi-core processor (multi-CPU). The processor herein may be one or more communication devices, circuits, and/or processing cores configured to process data (for example, computer program instructions).

The memory 502 may be a read-only memory (ROM) or another type of static storage communication device that can store static information and instructions, or a random access memory (RAM) or another type of dynamic storage communication device that can store information and instructions, or may be an electrically erasable programmable read-only memory (EEPROM), a compact disc read-only memory (CD-ROM) or another compact disc storage, an optical disc storage (including a compact disc, a laser disc, an optical disc, a digital versatile disc, a Blu-ray disc, or the like), a magnetic disk storage medium or another magnetic storage communication device, or any other medium that can be used to carry or store expected program code in a form of an instruction or a data structure and that can be accessed by a computer, but is not limited thereto. The memory 502 may be integrated with the processor 501, or may exist independently, and is coupled to the processor 501 through an input/output port (not shown in FIG. 5) of the communication apparatus 500. This is not limited in this embodiment of this application.

The memory 502 is configured to store a software program that performs the solution of this application, and the processor 501 controls execution. For an implementation, refer to the following method embodiments. Details are not described herein.

The transceiver 503 is configured to implement communication with another communication apparatus. For example, the communication apparatus 500 is a terminal device, and the transceiver 503 may be configured to communicate with a master node and/or a secondary node, or communicate with another terminal device. For another example, the communication apparatus 500 is an access network device such as the master node or the secondary node, and the transceiver 503 may be configured to communicate with a terminal device, another access network device, or a core network element. In addition, the transceiver 503 may include a receiver and a transmitter (not separately shown in FIG. 5). The receiver is configured to implement a receiving function, and the transmitter is configured to implement a sending function. The transceiver 503 may be integrated with the processor 501, or may exist independently, and is coupled to the processor 501 through an input/output port (not shown in FIG. 5) of the communication apparatus 500. This is not limited in this embodiment of this application.

It should be noted that the structure of the communication apparatus 500 shown in FIG. 5 does not constitute a limitation on the communication apparatus. An actual communication apparatus may include more or fewer components than those shown in the figure, or combine some components, or have different component arrangement.

Figure 6:
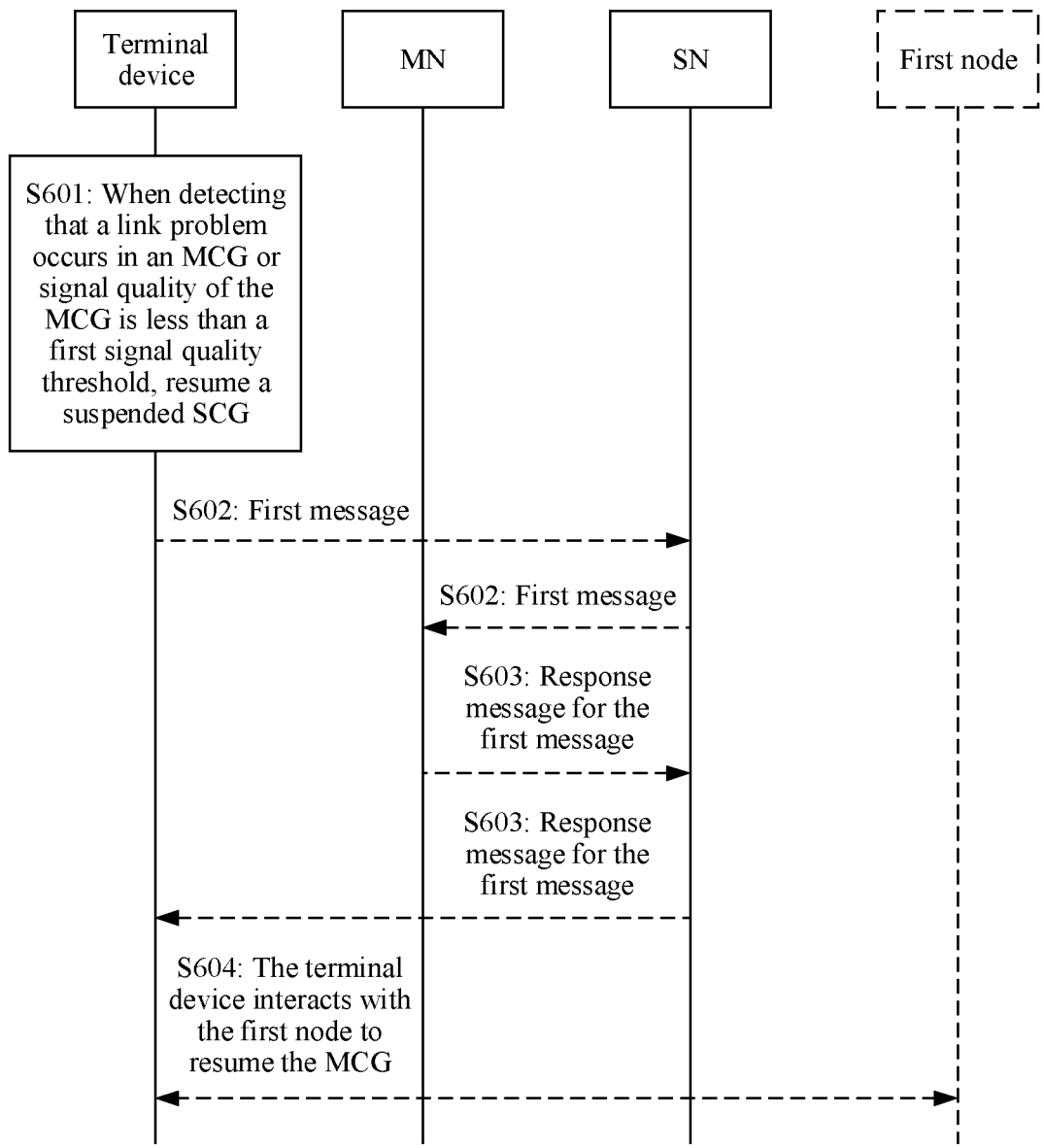
FIG. 6 is a flowchart of a communication method according to an embodiment of this application.
Figure 7:
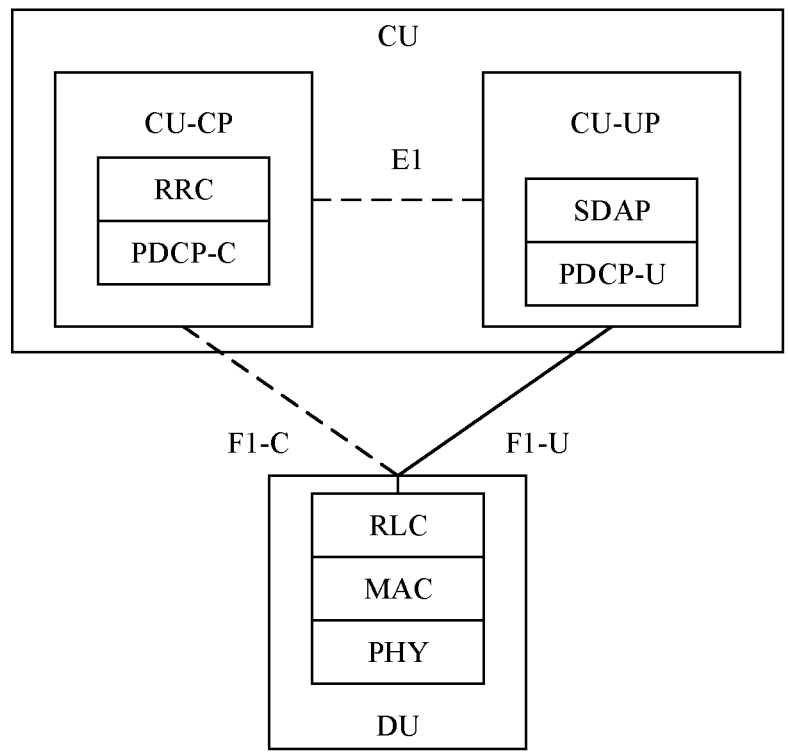
FIG. 7 is a diagram of an access network device using a CU/DU architecture according to an embodiment of this application.

The following describes in detail the communication methods provided in embodiments of this application with reference to FIG. 6 and FIG. 7.

FIG. 6 is a flowchart of a communication method according to an embodiment of this application. The communication method is applicable to communication between the terminal device and the secondary node and communication between the secondary node and the master node shown in any one of FIG. 1 to FIG. 4.

As shown in FIG. 6, the communication method includes the following steps.

S601: When detecting that a link problem occurs in a master cell group MCG or signal quality of the MCG is less than a first signal quality threshold, a terminal device resumes a suspended secondary cell group SCG.

The MCG is managed by a master node, and the SCG is managed by a secondary node. In other words, the master node is configured to manage the MCG for the terminal device, and the secondary node is configured to manage the SCG for the terminal device. For implementations of the master node, the secondary node, the MCG, and the SCG, refer to the foregoing system embodiment. Details are not described herein again.

It should be noted that before S601, the terminal device suspends the SCG. An operation of suspending the SCG by the terminal device may be triggered in any manner. This is not limited in this application. For example, the master node or the secondary node notifies the terminal device to suspend the SCG; or the terminal device requests the master node or the secondary node to suspend the SCG, and then the master node or the secondary node sends, to the terminal device, acknowledgment information for suspending the SCG.

Optionally, when detecting that the link problem occurs in the master cell group MCG or the signal quality of the MCG is less than the first signal quality threshold, and a network side (for example, the master node) configures a fast MCG link resuming function for the terminal device, the terminal device resumes the suspended secondary cell group SCG. The fast MCG link resuming function means that in MR-DC, when the terminal device detects that the link problem occurs in the MCG, the terminal device sends indication information to the master node by using the SCG. The indication information is used to indicate the link problem occurring in the MCG or indicate that the link problem occurs in the MCG.

It should be noted that, in an embodiment, S601 may be understood as including only an internal operation (namely, the following step 1) of the terminal device.

Step 1: When detecting that the link problem occurs in the master cell group MCG or the signal quality of the MCG is less than the first signal quality threshold, the terminal device determines a to-be-resumed cell in the suspended secondary cell group SCG.

In this embodiment of this application, that the terminal device suspends the SCG may be understood as that the terminal device pauses signaling transmission and/or data transmission performed by using a communication link of the SCG, but the terminal retains or stores a part or all of configurations of the SCG, to quickly resume the communication link of the SCG. In this embodiment of this application, "suspension" may also be referred to as deactivation or dormancy. A deactivated state may also be referred to as a suspended state, a dormant state, or an inactive state. For the suspended SCG, refer to an existing implementation. Details are not described in this embodiment of this application. It should be noted that when the SCG is suspended, the terminal device is still in a connected mode (RRC_CONNECTED).

Optionally, when the terminal device performs DRX and/or DTX in a part or all of cells in the SCG, that the terminal device suspends the SCG may further include: The terminal device pauses transmission with the SCG on a split SRB1 and/or an SRB3. The split SRB1 is used for signaling exchange between the terminal device and the master cell group in a split bearer mode. The signaling may be sent to the terminal device by using the master cell group and/or the secondary cell group. The SRB3 is used for direct signaling exchange between the terminal device and the secondary cell group. Optionally, that the terminal device suspends the SCG may further include: The terminal device suspends data transmission with the SCG on a split bearer and/or an SCG radio bearer.

It should be noted that, that when the terminal device performs DRX and/or DTX in a part or all of cells in the SCG, the terminal device pauses transmission with the SCG on a split SRB1 and/or an SRB3 herein may be implemented independently from or implemented jointly with resuming the suspended SCG when it is detected that the link problem occurs in the master cell group MCG or the signal quality of the MCG is less than the first signal quality threshold in this embodiment. In other words, when the network side notifies the terminal device to perform DRX and/or DTX in the SCG, the network side may further notify the terminal device to pause transmission with the SCG on the split SRB1 and/or the split SRB3. In this way, the terminal device only needs to send signaling in the resumed SCG, and does not need to send an uplink signal after the terminal device recovers from DRX and/or DTX, so that power consumption of the terminal device is reduced. When detecting that the link problem occurs in the master cell group MCG or the signal quality of the MCG is less than the first signal quality threshold, the terminal device may determine that the suspended SCG needs to be resumed, or may perform processing based on a conventional technology. For example, the terminal device may initiate an RRC reestablishment procedure or other technical processing. This is not limited in this embodiment of this application.

In addition, different cells in the SCG may be suspended in a same manner or different manners. For example, the SCG includes a cell A, a cell B, a cell C, and a cell D, where DRX and/or DTX are/is performed in the cell D. The cell A may be suspended in a deactivation manner, the cell B may be suspended in a dormancy manner, the cell C may be suspended in a manner of entering an inactive state, and the cell D may be suspended in a manner of pausing DRX and/or DTX.

Further, for any cell suspended in any one of the foregoing manners, only signaling transmission between the terminal device and the any cell may be suspended, or only data transmission between the terminal device and the any cell may be suspended, or both signaling transmission and data transmission between the terminal device and the any cell may be suspended. This is not limited in this embodiment of this application.

For example, the signal quality may be represented by using one or more of the following parameters: a reference signal received power (RSRP), reference signal received quality (RSRQ), or a signal to interference plus noise ratio (SINR). Correspondingly, the first signal quality threshold may include one or more of the following: a first RSRP threshold, a first RSRQ threshold, and a first SINR threshold. Correspondingly, that the signal quality of the MCG is less than the first signal quality threshold may include one or more of the following: an RSRP that is of the MCG and that is detected by the terminal device is less than or equal to the first RSRP threshold, RSRQ that is of the MCG and that is detected by the terminal device is less than or equal to the first RSRQ threshold, and an SINR that is of the MCG and that is detected by the terminal device is less than or equal to the first SINR threshold. The first signal quality threshold may be sent by the master node to the terminal device, or may be obtained by the terminal device in another manner. This is not limited in the present disclosure.

For example, that the link problem occurs in the master cell group MCG may include one or more of the following: an RLF occurs in the MCG, a handover failure or an RRC reconfiguration failure occurs in the MCG or the PCell (for example, the terminal device cannot comply with a part of configurations in an RRC reconfiguration message sent by the MCG), an RRC layer of the terminal device receives, from a bottom layer such as a PDCP layer, indication information indicating an integrity check failure on an SRB1 or an SRB2 (where the indication information may not include indication information indicating an integrity check failure of an RRC reestablishment message), and another problem that causes abnormal link communication of the MCG. This is not limited in this embodiment of this application.

That an RLF occurs in the master cell group MCG may include one or more of the following: The terminal device detects that downlink signal quality of the MCG is less than or equal to a second signal quality threshold; the RRC layer of the terminal device receives a random access problem indication from an MCG MAC entity, where the MCG MAC entity may be a MAC entity that corresponds to the MCG and that is at a MAC layer of the terminal device; or a data packet that is of an SRB or a DRB and that is received from an MCG RLC entity reaches a maximum quantity of retransmission times, where the MCG RLC entity may be an RLC entity that corresponds to the MCG and that is at an RLC layer of the terminal device. It may be understood that, in addition to the entities separately corresponding to the MCG, the MAC layer or the RLC layer of the terminal device may further include a MAC entity or an RLC entity corresponding to the SCG. That downlink signal quality of the MCG is less than or equal to a second signal quality threshold may be: The RRC layer of the terminal device receives, from a physical layer, N consecutive out-of-synchronization indications of the PCell, and then the terminal device may start a timer T310. If the RRC layer of the terminal device does not receive, from the physical layer, M consecutive synchronization indications of the PCell before T310 expires, the terminal device considers that the RLF occurs in the MCG. Both N and M are integers greater than or equal to 1, and values of N and M may be preconfigured by a network side for the terminal device. In addition, the second signal quality threshold may further include one or more of the following: a second RSRP threshold, a second RSRQ threshold, and a second SINR threshold. Correspondingly, that downlink signal quality of the MCG is less than or equal to a second signal quality threshold may include one or more of the following: an RSRP that is of the MCG and that is detected by the terminal device is less than or equal to the second RSRP threshold, RSRQ that is of the MCG and that is detected by the terminal device is less than or equal to the second RSRQ threshold, and an SINR that is of the MCG and that is detected by the terminal device is less than or equal to the second SINR threshold. It should be noted that the downlink signal quality of the MCG may be comprehensive downlink signal quality of downlink signal quality that is of all cells in the MCG and that is measured by the terminal device, or may be downlink signal quality that is of the PCell in the MCG and that is measured by the terminal device.

It should be understood that the signal quality, the first signal quality threshold, and the second signal quality threshold may alternatively be implemented by using another technical indicator. This is not limited in this embodiment of this application.

It should be noted that, in a process from normal communication to occurrence of the radio link problem in the MCG, that the signal quality is less than or equal to the first signal quality threshold usually occurs before that the signal quality is less than or equal to the second signal quality threshold. In other words, the first RSRP threshold is greater than the second RSRP threshold, the first RSRQ threshold is greater than the second RSRQ threshold, and the first SINR threshold is greater than the second SINR threshold. In this way, the terminal device may resume the SCG in advance before the link problem occurs in the MCG, so that when the link problem occurs in the MCG, the link problem occurring in the MCG may be notified to the master node as soon as possible by using the SCG resumed in advance, that is, the following S603 and S604 may be performed as early as possible to resume the MCG, to reduce duration of communication interruption between the terminal device and the MCG, so that reliability of communication between the terminal device and the MCG is improved.

Corresponding to the implementation in which the terminal device suspends the SCG, the terminal device may resume the SCG in the following manner: activating a part or all of deactivated cells in the SCG; waking up a part or all of cells that are in a dormant state in the SCG; activating a part or all of cells that are in an inactive state in the SCG, or the like. Details are not described in this embodiment of this application.

Optionally, when the terminal device performs DRX and/or DTX in a part or all of cells in the SCG, that the terminal device resumes the SCG may further include: The terminal device resumes transmission, on the split signaling radio bearer SRB1 and/or the signaling radio bearer SRB3, with a cell that has paused performing DRX and/or DTX in the SCG.

Optionally, that the terminal device resumes the SCG may further include: The terminal device resumes data transmission, on the split radio bearer and/or the SCG bearer, with a cell that has paused performing DRX and/or DTX in the SCG.

An example in which the SCG includes a cell A, a cell B, a cell C, and a cell D is used for description. The cell A may be resumed in an activation manner, the cell B may be resumed in a wake-up manner, the cell C may be resumed in a manner of entering an active state, and the cell D may be resumed in a manner of resuming performing DRX and/or DTX.

In addition, for any cell resumed in any one of the foregoing manners, only a part or all of signaling transmission between the terminal device and the any cell may be resumed, or only a part or all of data transmission between the terminal device and the any cell may be resumed, or a part or all of signaling transmission and a part or all of data transmission between the terminal device and the any cell may be resumed. This is not limited in this embodiment of this application.

In an embodiment, that the terminal device determines a to-be-resumed cell in the suspended secondary cell group SCG in step 1 may include: The terminal device determines to resume transmission with the to-be-resumed cell in the SCG on the split signaling radio bearer SRB1 and/or the signaling radio bearer SRB3. The split SRB1 is used for signaling exchange between the terminal device and the master cell group in a split bearer mode. The signaling may be sent to the terminal device by using the master cell group and/or the secondary cell group. The SRB3 is used for direct signaling exchange between the terminal device and the secondary cell group. Optionally, resuming the suspended secondary cell group SCG may further include: The terminal device resumes data transmission with the SCG on the split radio bearer and/or the SCG radio bearer.

For example, the terminal device may include a radio resource control RRC layer entity and a packet data convergence protocol PDCP layer entity. Optionally, the communication method shown in FIG. 6 may further include:

The radio resource control RRC layer entity of the terminal device sends first indication information to the packet data convergence protocol PDCP layer entity of the terminal device. The first indication information indicates to resume the SCG, for example, indicate a resuming manner and resuming content of the SCG. The resuming content may include one or more cells to be resumed in the SCG, and a signaling radio bearer and/or a data radio bearer to be resumed in each cell.

Optionally, the first indication information may be used to indicate to resume signaling transmission between the terminal device and the SCG on the split SRB1 and/or the SRB3. Further, the first indication information may be used to indicate to resume data transmission between the terminal device and the SCG on the split radio bearer (split bearer) or the SCG bearer.

Optionally, that the terminal device suspends the SCG, and resumes the suspended SCG when detecting that the link problem occurs in the master cell group MCG or the signal quality of the MCG is less than the first signal quality threshold in step S601 may include the foregoing step 1, and/or include that the terminal device requests the secondary node to resume communication between the terminal device and the SCG, namely, the following step 2. The following describes step 2.

Step 2: The terminal device interacts with the secondary node, to resume transmission between the terminal device and the secondary node in the SCG.

In an embodiment, step 2 may include: The terminal device initiates a random access process to the secondary node. For example, the terminal device sends a random access request preamble to the secondary node. Correspondingly, the secondary node sends a random access response message to the terminal device. The random access request preamble is used by the terminal device to request to access the secondary node, and the random access response message notifies the terminal device whether the secondary node accepts a random access request initiated by the terminal device. If the secondary node accepts the random access request initiated by the terminal device, the random access response message may carry acceptance indication information and configuration information of a radio resource allocated by the secondary node to the terminal device, for example, resource allocation information for the terminal device to send next information (for example, the terminal device sends a MAC control element, where the MAC control element carries a cell radio network temporary identifier (C-RNTI) allocated by the secondary node to the terminal device). If the secondary node rejects the random access request initiated by the terminal device, the random access response message may carry rejection indication information or the secondary node does not send the random access response message.

Optionally, after the secondary node receives the MAC control element that is sent by the terminal device and that carries the C-RNTI allocated by the secondary node to the terminal device, the secondary node knows that the terminal device requests to resume the SCG, so that the suspended SCG can be resumed. Optionally, in or after the random access process, the terminal device sends, to the SCG, a request message for resuming the SCG. Optionally, the request message for resuming the SCG may request to resume transmission between the terminal device and the SCG on the split SRB1 and/or the SRB3. Further, the first indication information may be further used to indicate to resume transmission between the terminal device and the SCG on the split bearer or the SCG bearer. Optionally, when a timing alignment (TA) timer that corresponds to the SCG and that is of the terminal device expires (for example, exceeds a time threshold delivered by the network side (for example, the secondary node)), the terminal device initiates the random access process to the secondary node.

In an embodiment, step 2 in which the terminal device interacts with the secondary node, to resume transmission between the terminal device and the secondary node in the SCG may include: The terminal device sends an physical uplink control channel (PUCCH) to the secondary node. When the secondary node receives the physical uplink control channel, the secondary node sends, to the terminal device, the resource allocation information for the next information (for example, a first message in the following S603 or a request message sent by the terminal device to the SCG for resuming the SCG). After receiving the PUCCH sent by the terminal device, the secondary node knows that the terminal device requests to resume the SCG, so that the suspended SCG can be resumed. Optionally, when the timing calibration timer that corresponds to the SCG and that is of the terminal device does not expire, the terminal device sends the physical uplink control channel to the secondary node.

Optionally, the secondary node may resume transmission between the terminal device and the SCG on the split signaling radio bearer SRB1 and/or the signaling radio bearer SRB3, that is, resume signaling transmission. For example, transmission between the terminal device and the primary secondary cell on the split SRB1 and/or the split SRB3 is resumed. In this way, the terminal device can actively resume signaling transmission with the primary secondary cell, to resume communication between the terminal device and the network side, so that communication reliability is improved.

Optionally, the secondary node may further resume transmission between the terminal device and the primary secondary cell on the DRB, that is, resume data transmission. In this way, the terminal device may further actively resume data transmission with the primary secondary cell, to provide a data transmission service for the terminal device.

Further, the secondary node may further resume transmission, on the SRB and/or the DRB, between the terminal device and one or more secondary cells in the SCG, that is, resume signaling transmission and/or data transmission of a part or all of secondary cells in the SCG, to provide the terminal device with a data transmission service with a higher rate.

For an implementation of the resuming manner and the resuming content of the SCG, refer to related content in step 1. Details are not described herein again.

Optionally, when it is detected that the link problem occurs in the master cell group MCG or the signal quality of the MCG is less than the first signal quality threshold, and the terminal device does not detect that a link problem occurs in the secondary cell group SCG (that is, a link between the terminal device and the secondary node is normal) or signal quality of the SCG is greater than a third signal quality threshold, the terminal device resumes the suspended secondary cell group SCG. A meaning of detecting that a link problem occurs in the secondary cell group SCG may be: The RRC layer of the terminal device receives, from the physical layer, N1 consecutive out-of-synchronization indications of the PSCell, and then the terminal device may start a timer T310. If the RRC layer of the terminal device does not receive, from the physical layer, M1 consecutive synchronization indications of the PSCell before T310 expires, the terminal device considers that an RLF occurs in the SCG. Both N1 and M1 are integers greater than or equal to 1, and values of N1 and M1 may be preconfigured by the network side for the terminal device. That downlink signal quality of the SCG is greater than a third signal quality threshold may include one or more of the following: an RSRP that is of the SCG and that is detected by the terminal device is greater than a third RSRP threshold, RSRQ that is of the SCG and that is detected by the terminal device is greater than a third RSRQ threshold, and an SINR that is of the SCG and that is detected by the terminal device is greater than a third SINR threshold. It should be noted that the downlink signal quality of the SCG may be comprehensive downlink signal quality of downlink signal quality that is of all cells in the SCG and that is measured by the terminal device, or may be downlink signal quality that is of the PSCell in the SCG and that is measured by the terminal device.

In an embodiment, the communication method shown in FIG. 6 may further include: After it is detected that the link problem occurs in the MCG or the signal quality of the MCG is less than the signal quality threshold, the terminal device determines that a maximum transmit power used by the terminal device to send a signal to the SCG is a first maximum transmit power. The first maximum transmit power is greater than a second maximum transmit power, and the second maximum transmit power is a maximum transmit power used by the terminal device to send a signal to the SCG before the SCG is suspended. In other words, the terminal device may send a signal, for example, send the random access request message, to the SCG at a transmit power as large as possible, to resume the SCG as soon as possible, so as to further improve the communication reliability.

In this embodiment of this application, in view of that all cells in the SCG are cells on the secondary node, that the terminal device sends a signal to the SCG may also be understood as that the terminal device sends the signal to the secondary node by using the SCG, or that the terminal device sends the signal to the secondary node.

For a same terminal device, a maximum transmit power supported by the terminal device is a total maximum transmit power of the terminal device. In dual connectivity, a sum of an actual transmit power (referred to as the first transmit power below) used by the terminal device to send a signal to the MCG and an actual transmit power (referred to as the second transmit power below) used by the terminal device to send a signal to the SCG cannot exceed the total maximum transmit power at any moment. If the terminal device sends a signal in a time division multiplexing (TDM) manner, that is, sends the signal in a non-overlapping part (referred to as non-overlapping for short below) between a time period in which the terminal device sends a signal to the MCG and a time period in which the terminal device sends a signal to the SCG, the first transmit power or the second transmit power may be less than or equal to the total maximum transmit power. Certainly, if the terminal device sends a signal in an overlapping part (referred to as overlapping for short below) between the sending time period in which the terminal device sends a signal to the MCG and the sending time period in which the terminal device sends a signal to the SCG, that is, the terminal device simultaneously sends signals to the MCG and the SCG, the sum of the first transmit power and the second transmit power also needs to be less than or equal to the total maximum transmit power.

It should be understood that, during actual application, values of the first transmit power and the second transmit power may be further determined with reference to one or more of the following: a maximum transmit power that is of the terminal device in the MCG and that is configured by the network side, a maximum transmit power of the terminal device in the SCG, a predefined maximum transmit power of the terminal device in the MCG, and a predefined maximum transmit power of the terminal device in the SCG. The following uses an example for description.

Manner 1 (Option 1): When the SCG is not suspended, a semi-persistent power sharing solution between the MCG and the SCG is as follows: When the terminal device performs uplink transmission in one CG, for example, a CG 1, the terminal device checks a semi-persistent transmission direction configuration configured for another CG, for example, a CG 2. The semi-persistent transmission direction configuration is that, for example, a symbol is used for uplink transmission or downlink transmission, or may be flexibly configured. That the symbol is flexibly configured means that the symbol may be used for uplink transmission or downlink transmission, and whether the symbol is used for uplink transmission or downlink transmission may be determined by the terminal device. The network side notifies the terminal device in advance whether a semi-persistent transmission direction corresponding to a symbol is uplink transmission or downlink transmission, or is flexibly configured. If there may be an overlapping part between uplink transmission in the CG 1 and uplink transmission in the CG 2, for example, on a symbol or some symbols, a semi-persistent transmission direction configured on a carrier in the CG 2 is also uplink transmission or is flexibly configured, the terminal device limits an actual transmit power in the CG 1 to a maximum transmit power (which may be preconfigured by the network side for the terminal device by using an RRC message) configured by the network side. Otherwise, if there is no-overlapping, a maximum transmit power for uplink transmission of the terminal device in the CG 1 is a predefined value.

Manner 2 (Option 2): When the SCG is not suspended, a semi-persistent power sharing solution between the MCG and the SCG is as follows: A maximum transmit power of the terminal device in each CG cannot exceed a maximum transmit power configured by the network side for the terminal device in the corresponding CG. In this case, the terminal device does not need to determine whether uplink transmission in the two CGs overlaps, and only that the maximum transmit power in each CG does not exceed the maximum transmit power configured by the network needs to be considered.

Manner 3: When the SCG is not suspended, a dynamic power sharing solution between the MCG and the SCG is as follows: When an uplink signal is sent in a CG, for example, a CG 1, if uplink transmission in the CG 1 overlaps uplink transmission in another CG, for example, a CG 2, a maximum transmit power of uplink transmission of the terminal device in the CG 1 does not exceed a maximum transmit power that is configured by the network side for the terminal device in the CG 1. Otherwise (if there is no overlapping), the maximum transmit power of uplink transmission of the terminal device in the CG 1 does not exceed a value predefined in a protocol, for example, a maximum transmit power defined in a RAN4 protocol. The terminal device may determine, by using the following solution, whether uplink transmission in two CGs overlaps: When a start point of uplink transmission in the SCG is T0, the terminal device considers whether uplink transmission that is in the MCG and that is scheduled by using a physical downlink control channel (PDCCH) overlaps the uplink transmission in the SCG before T0-T_offset. T_offset is a timing advance of the uplink transmission in the MCG relative to the uplink transmission in the SCG. If the uplink transmission overlaps, a maximum transmit power of the terminal device in the SCG is min{a maximum transmit power that is in the SCG and that is configured by the network side, a total maximum transmit power of the terminal device—an actual transmit power in the MCG}, where the operator min{x, y} indicates that a minimum value in x and y is obtained. Otherwise (if there is no overlapping), the maximum transmit power of the terminal device in the SCG is the total maximum transmit power of the terminal device.

With reference to Manner 1 to Manner 3, when the SCG for the terminal device is suspended, the maximum transmit power of the terminal device in the MCG may be different from the maximum transmit power of the terminal device in the MCG when the SCG for the terminal device is normal. In other words, the terminal device may send a signal to the MCG by using the maximum transmit power. For example, if a power sharing mode configured by the network side for the terminal device is Manner 1, the maximum transmit power used by the terminal device to send a signal to the MCG may not exceed the maximum transmit power predefined in the protocol, for example, the maximum transmit power defined in the RAN4 protocol. For another example, if the power sharing mode configured by the network side for the terminal device is Manner 2, the maximum transmit power used by the terminal device to transmit a signal to the MCG may not exceed the maximum transmit power configured by the network side. For still another example, if the power sharing mode configured by the network side for the terminal device is Manner 3, the maximum transmit power used by the terminal device to transmit a signal to the MCG may not exceed the maximum transmit power configured by the network side. For still another example, regardless of which sharing mode is used, the maximum transmit power used by the terminal device to transmit a signal to the MCG may not exceed the total maximum transmit power of the terminal device.

Similarly, in this embodiment of this application, when the terminal device detects that the link problem occurs in the MCG, and/or the signal quality of the MCG is less than or equal to the signal quality threshold, the terminal device may pause sending a signal to the MCG, but may use all available transmit powers, for example, the total maximum transmit power, to send a signal to the SCG (that is, it only needs to be ensured that the maximum transmit power used by the terminal device to send a signal to the SCG does not exceed the total maximum transmit power). In other words, in this case, the terminal device may not consider whether the sending time period in which the terminal device sends a signal to the MCG overlaps the sending time period in which the terminal device sends a signal to the SCG. The terminal device may interact with the secondary node at a transmit power as large as possible without being limited by a power between the MCG and the SCG that is configured by the network, to resume the suspended SCG as soon as possible, so as to resume communication between the terminal device and the network side, and improve the communication reliability.

In another embodiment, the communication method shown in FIG. 6 may further include: The terminal device sends a signal, for example, the random access request message sent by the terminal device and the following first message, to the SCG in a first time period. Correspondingly, the secondary node receives the signal from the terminal device in the first time period.

The first time period includes a time period in which the terminal device sends a signal to the MCG based on a time division multiplexing pattern (TDM pattern) between the MCG and the SCG and a time period in which the terminal device sends a signal to the SCG based on the time division multiplexing pattern. In other words, the terminal device may not need to consider a limitation of time division multiplexing between the MCG and the SCG that is previously configured by the network side. The terminal device may send a signal to the SCG in all time periods originally used to send a signal to the MCG and the SCG, to resume the SCG as soon as possible, so as to further improve the communication reliability.

Optionally, that the terminal device sends a signal to the SCG in a first time period may include: The terminal device sends the signal to the SCG from a first moment. The first moment is an earliest sending moment in a plurality of sending moments (also referred to as transmission occasions) in the first time period. In this way, the terminal device may send the signal to the SCG at the earliest sending moment, to resume the SCG as soon as possible, so as to further improve the communication reliability.

It should be noted that a solution of the first maximum transmit power and a solution of the first time period may be implemented independently, or may be implemented in combination. For example, the terminal device may send the signal to the SCG at the plurality of sending moments in the first time period by using the first maximum transmit power. Further, the plurality of sending moments in the first time period may include the first moment.

The foregoing describes in detail how the terminal device requests the secondary node to resume the SCG. With reference to an example of a physical architecture of an access network device, the following describes in detail an operation performed by the secondary node in a process of resuming the SCG.

For example, FIG. 7 is a diagram of an access network device according to an embodiment of this application. The access network device may be the master node or the secondary node. As shown in FIG. 7, the access network device includes a CU and a DU. The CU may be further divided into a CU-CP and a CU-UP. The CU-CP communicates with the DU through an F1-C interface, the CU-UP communicates with the DU through an F1-U interface, and the CU-CP communicates with the CU-UP through an E1 interface.

As shown in FIG. 7, when the DU of the secondary node receives uplink information (for example, receives information related to the foregoing random access process or the PUCCH) from the terminal device, the DU of the secondary node may resume transmission of the terminal device in the SCG. Optionally, the DU of the secondary node may notify or request the CU-CP to resume SCG transmission of the terminal device on the secondary node. Optionally, when the CU-CP of the secondary node receives the notification or the request, the CU-CP may further notify the CU-UP to resume SCG transmission of the terminal device on the secondary node. In another design solution, after the CU of the secondary node receives the first message sent by the terminal device in S603 below, the CU notifies the DU to resume data transmission and/or signaling transmission of the terminal device in the SCG.

Optionally, if context information of the terminal device does not exist in the DU of the secondary node, for example, when the SCG is suspended, the CU of the secondary node has notified the DU of the secondary node to delete the context information of the terminal device, when the DU of the secondary node receives the uplink data sent by the terminal device, the DU of the secondary node first sends an initial uplink RRC message transfer message to the CU, and then the CU of the secondary node interacts with the DU of the secondary node, to establish a context of the terminal device. For example, the CU of the secondary node may send a UE context setup request message to the DU of the secondary node, and then receive a UE context setup response message from the DU of the secondary node.

It should be noted that, after performing S601, for example, performing step 1, or performing step 1 and step 2, the terminal device may further notify, to the master node via the secondary node, the link problem occurring in the MCG or that the link problem occurs in the MCG. Therefore, optionally, the communication method may further include S602 to S604.

S602: The terminal device sends the first message to the master node via the secondary node. Correspondingly, the master node receives the first message from the terminal device via the secondary node.

The first message includes second indication information, and the second indication information is used to indicate the link problem occurring in the MCG or indicate that the link problem occurs in the MCG. For an implementation of the link problem occurring in the MCG, refer to the foregoing step 1, and details are not described herein again. In this way, the master node may resume the MCG based on the second indication information, for example, indicate the terminal device to perform a handover procedure or a reconfiguration procedure, to further improve the communication reliability.

It should be noted that before the master node receives the first message, the master node considers that the SCG for the terminal device is suspended. After receiving the first message, the master node learns that the terminal device resumes the suspended secondary cell group SCG.

In an embodiment, S602 in which the terminal device sends the first message to the master node via the secondary node may include: After the secondary node accepts the random access request initiated by the terminal device, for example, after the terminal device receives, from the secondary node, a random access response that carries an acceptance indication, the terminal device sends the first message to the master node via the secondary node.

The secondary node may perform the following step: After the secondary node sends the random access response that carries the acceptance indication to the terminal device, the secondary node receives the first message from the terminal device, and sends the first message to the master node through the interface between the master node and the secondary node, for example, the Xn interface or the X2 interface.

Correspondingly, S602 in which the master node receives the first message from the terminal device via the secondary node may include: The secondary node receives the first message from the terminal device through an air interface. Further, the master node may receive the first message from the secondary node through the interface between the master node and the secondary node, for example, the Xn interface or the X2 interface. For example, the master node receives the first message by using an RRC transfer message on the Xn interface or the X2 interface, that is, the RRC transfer message carries the first message.

The first message may be an MCG failure information message. The following examples are separately used for description.

For example, in a split SRB1 scenario, the terminal device sends the MCG failure information message to the master node via the secondary node. After receiving the MCG failure information message from the terminal device, the secondary node sends the RRC transfer message to the master node, where the RRC transfer message carries the MCG failure information message. In this scenario, the secondary node directly sends the received MCG failure information message to the master node, and does not need to extract the MCG failure information message from another RRC message. Correspondingly, the master node receives the MCG failure information message forwarded by the secondary node, and obtains content in the MCG failure information message.

For another example, in an SRB3 scenario, the terminal device may encapsulate the MCG failure information message in another message, or include the MCG failure information message in a container in another message, and send the another message to the secondary node. Optionally, the terminal device encapsulates the MCG failure information message in a multi-radio dual connectivity uplink information transfer (UL Information Transfer MR-DC) message and sends the multi-radio dual connectivity uplink information transfer message to the secondary node. Further, after receiving the message including the MCG failure information message, the secondary node may extract the MCG failure information message encapsulated in the message, and then send the MCG failure information message to the master node by using the RRC transfer message, that is, the RRC transfer message carries the MCG failure information message. The MCG failure information message may be encapsulated in the RRC transfer message or included in a container in the RRC transfer message.

In an embodiment, similar to the implementation in which the terminal device sends a signal to the SCG in the first time period in step 2, the communication method shown in FIG. 6 may further include: The terminal device sends a signal to the master node in the first time period via the secondary node. Correspondingly, the master node receives the signal from the terminal device in the first time period via the secondary node. In other words, the terminal device may not need to consider a limitation of the time division multiplexing between the MCG and the SCG. The terminal device may send, via the secondary node, a signal to the master node in all the time periods originally used to separately send a signal to the MCG and the SCG, to resume the MCG as soon as possible, so as to further improve the communication reliability.

Further, in a process in which S602 is performed, the transmit power used by the terminal device to send a signal (carrying the second indication information) to the SCG may also be determined based on the first maximum transmit power in step 2. For an implementation of the first maximum transmit power, refer to step 2. Details are not described herein again.

S603: The master node sends a response message for the first message to the terminal device via the secondary node. Correspondingly, the terminal device receives the response message for the first message from the master node via the secondary node.

The response message for the first message may be an RRC reconfiguration message or an RRC release message that carries synchronization information, or may be another message. The RRC release message is used to indicate the terminal device to release an RRC connection on which a link problem occurs, to notify the terminal device that the network side cannot resume the MCG.

The synchronization information is used to indicate the terminal device to resume the MCG, for example, indicate the terminal device to perform a handover procedure or a reconfiguration procedure to resume the MCG. That is, the RRC reconfiguration message may be used to indicate the terminal device to resume the MCG, so as to further improve the communication reliability. Optionally, the RRC reconfiguration message may be further used to indicate the terminal device to suspend the SCG again, to reduce power consumption of the terminal device.

S603 in which the master node sends the response message for the first message to the terminal device via the secondary node may include: The master node may send the response message for the first message to the secondary node through the interface between the master node and the secondary node, for example, the Xn interface or the X2 interface. For example, the master node sends the response message for the first message to the secondary node by using an RRC transfer message transmitted through the Xn interface or the X2 interface, that is, the RRC transfer message carries the response message for the first message. Further, the secondary node directly and transparently transmits, through an air interface, the response message for the first message to the terminal device, or includes the response message for the first message in another message and sends the another message to the terminal device. The following uses an example for description.

In an embodiment, the response message for the first message may be an RRC reconfiguration message or an RRC release message that carries synchronization information. For example, in a split SRB1 scenario, the master node may send an RRC transfer message to the secondary node through the interface between the master node and the secondary node, for example, the Xn interface or the X2 interface. The RRC transfer message carries the RRC reconfiguration message or the RRC release message that carries the synchronization information. Correspondingly, the secondary node receives, from the master node through the interface between the secondary node and the master node, for example, the Xn interface or the X2 interface, the RRC reconfiguration message or the RRC release message that carries the synchronization information. For example, the master node sends, by using the RRC transfer message on the Xn interface or the X2 interface, the response message for the first message, that is, the RRC transfer message carries the response message for the first message. Then, the secondary node sends, to the terminal device, the response message that is for the first message and that is received from the master node.

In another embodiment, the response message for the first message may alternatively be another message that is sent to the terminal device and in which the RRC reconfiguration message or the RRC release message that carries the synchronization information is encapsulated, for example, a multi-radio dual connectivity downlink information transfer (DL Information Transfer MR-DC) message. For example, in an SRB3 scenario, the master node sends, to the secondary node through the interface between the master node and the secondary node, for example, the Xn interface or the X2 interface, the RRC reconfiguration message or the RRC release message that carries the synchronization information. For example, the master node sends the response message for the first message through the RRC transfer message on the Xn interface or the X2 interface, that is, the RRC transfer message carries the response message for the first message. Correspondingly, the secondary node receives the message from the master node through the interface between the secondary node and the master node, for example, the Xn interface or the X2 interface. The secondary node may encapsulate the response message for the first message in another message, for example, a multi-radio dual connectivity downlink information transfer message, and send the another message to the terminal device.

S604: The terminal device interacts with the first node to resume the MCG.

The terminal device may interact with the first node based on the response message for the first message, to resume the MCG. For example, the terminal device may access a first cell in a first node based on the response message for the first message, and send an RRC reconfiguration complete message to the first cell in the first node after successfully accessing the first cell.

In an embodiment, the first node may be an MN, and the first cell may be an original primary cell. In other words, the terminal device resumes the MCG by performing an RRC reconfiguration procedure. Optionally, the first cell may be another cell in the MN, for example, a secondary cell in the MCG or another cell that is located in the MN but does not belong to the MCG. In other words, the terminal device resumes the MCG by performing an intra-base-station handover procedure.

In another embodiment, the first node may alternatively be a node other than the MN, for example, the SN or a node other than the MN and the SN. The first cell may be a cell of the first node. In other words, the terminal device resumes the MCG by performing an inter-base-station handover procedure.

For example, transmission between the terminal device and the MCG on the split SRB1 and/or the SRB3 may be resumed, that is, signaling transmission is resumed.

Optionally, transmission between the terminal device and one or more cells in the MCG on the DRB may be further resumed, that is, data transmission is resumed.

Further, a scheduling occasion limitation and/or a transmit power limitation between the MCG and the SCG may be further resumed. For an implementation, refer to related content of the time division multiplexing pattern and the manner 1 to the manner 3 in step 1. Details are not described herein again.

Alternatively, optionally, after the MCG is resumed, the terminal device may suspend the SCG again, to reduce power consumption of the terminal device.

Further, the terminal device may record random access information. The random access information is information about a random access procedure initiated by the terminal device in a process in which the terminal device performs an SCG resuming procedure. The random access process may include a plurality of access attempts. Correspondingly, the random access information may include one or more pieces of the following information of each access attempt: conflict indication information (that is, indicating whether a conflict occurs with a random access process initiated by another terminal device to the SCG), an identifier of a sent random access preamble, configuration information of a synchronization signal block (SSB) used to send the random access preamble, a quantity of times for which the random access preamble is sent, access indication information, and the like. The conflict indication is used to indicate whether a random access procedure initiated by the terminal device to the SCG conflicts with a random access procedure initiated by another terminal device to the SCG, and the access indication information is used to indicate that the random access information is recorded when the random access procedure is performed in a process in which the SCG is resumed.

It should be noted that if no MCG RLF occurs in a specified time period after the SCG is resumed, the terminal device may indicate the SCG to automatically fall back to a suspended state. For example, the RRC layer entity of the terminal device may send first indication information to the PDCP layer entity of the terminal device, where the first indication information indicates to suspend the SCG. In the specified time period, the terminal device may not send data, that is, resuming the SCG is merely a preparation for resuming the MCG. For example, in S601, when the terminal device detects that the signal quality of the MCG is less than the first signal quality threshold, the terminal device determines a to-be-resumed cell in the suspended SCG. After the SCG is resumed, in a specified time period after S601 is successfully performed, if the signal quality of the MCG does not further deteriorate to a degree that the MCG RLF occurs, the terminal device may suspend the SCG again, to reduce power consumption of the terminal device. A value of the specified time period may be determined based on an actual communication requirement. The value and an implementation of the specified time period are not limited in this embodiment of this application.

Based on the communication method described in the foregoing method embodiment, when the terminal device detects that the link problem occurs in the MCG or the signal quality of the MCG deteriorates, that is, when the terminal device learns that quality of communication with the master node in the MCG deteriorates, the terminal device may resume the suspended SCG, to resume communication between the terminal device and the secondary node in the SCG, so as to improve communication reliability of the terminal device.

The foregoing describes in detail the communication method provided in embodiments of this application with reference to FIG. 6 and FIG. 7. The following describes in detail another communication apparatus provided in an embodiment of this application with reference to FIG. 8.

Figure 8:
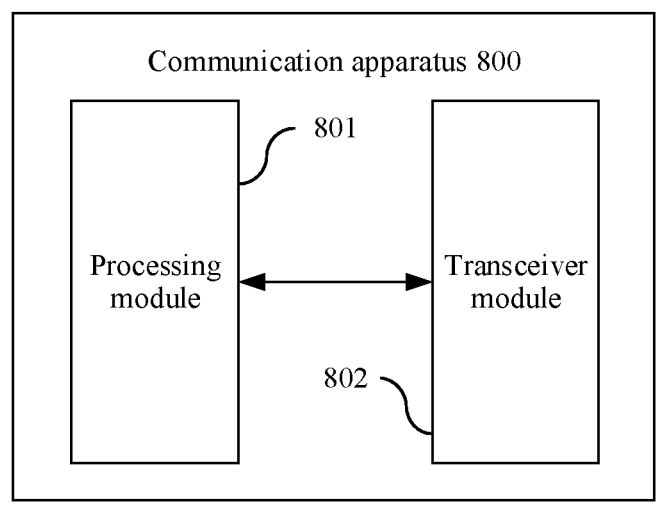
FIG. 8 is a diagram 2 of a communication apparatus according to an embodiment of this application.

For example, FIG. 8 is a diagram 2 of a communication apparatus according to an embodiment of this application. The communication apparatus may be the terminal device, the secondary node, or the master node shown in FIG. 1, the communication apparatus 500 shown in FIG. 5, or a chip (system) or another component that may be disposed in the terminal device, the secondary node, or the master node shown in FIG. 1, or disposed in the communication apparatus 500 shown in FIG. 5. This is not limited in this embodiment of this application.

As shown in FIG. 8, the communication apparatus 800 includes a processing module 801 and a transceiver module 802. For ease of description, FIG. 8 shows only main components of the communication apparatus 800.

In an embodiment, the communication apparatus 800 is applicable to the communication system shown in FIG. 1, and performs functions of the terminal device in the communication method shown in FIG. 6. Details are described below.

The processing module 801 is configured to: when controlling the transceiver module 802 to detect that a link problem occurs in a master cell group MCG or signal quality of the MCG is less than a signal quality threshold, resume a suspended secondary cell group SCG. The MCG is managed by a master node, and the SCG is managed by a secondary node.

In an embodiment, the processing module 801 is further configured to resume transmission with the SCG on a split signaling radio bearer SRB1 and/or a signaling radio bearer SRB3.

For example, the processing module 801 may include a radio resource control RRC layer entity and a packet data convergence protocol PDCP layer entity. Optionally, the RRC layer entity is configured to send first indication information to the PDCP layer entity. The first indication information indicates to resume the SCG.

Further, the transceiver module 802 is further configured to send second indication information to the master node via the secondary node. The second indication information is used to indicate the link problem occurring in the MCG or indicate that the link problem occurs in the MCG.

Optionally, the transceiver module 802 is further configured to: after the secondary node accepts a random access request initiated by the communication apparatus 800, send the second indication information to the master node via the secondary node.

For example, the second indication information may be included in a first message for transmission. The first message may be an MCG failure message, or another message including an MCG failure message.

Optionally, the transceiver module 802 is further configured to receive a response message for the first message from the master node via the secondary node. The response message for the first message may be an RRC reconfiguration message or an RRC release message. Optionally, the RRC reconfiguration message may be used to indicate the terminal device to suspend the SCG.

In an embodiment, the processing module 801 is further configured to: after it is detected that the link problem occurs in the MCG or the signal quality of the MCG is less than the signal quality threshold, determine that a maximum transmit power used by the communication apparatus 800 to send a signal to the SCG is a first maximum transmit power. The first maximum transmit power is greater than a second maximum transmit power, and the second maximum transmit power is a maximum transmit power used by the communication apparatus 800 to send a signal to the SCG before the SCG is suspended.

In another embodiment, the transceiver module 802 is further configured to send a signal to the SCG in a first time period. The first time period includes a time period in which the communication apparatus 800 sends a signal to the MCG based on a time division multiplexing pattern between the MCG and the SCG and a time period in which the communication apparatus 800 sends a signal to the SCG based on the time division multiplexing pattern.

Optionally, the transceiver module 802 is further configured to send the signal to the SCG from a first moment. The first moment is an earliest sending moment in a plurality of sending moments in the first time period.

It should be noted that a solution of the first maximum transmit power and a solution of the first time period may be implemented independently, or may be implemented in combination. For example, the transceiver module 802 may send the signal to the SCG at the plurality of sending moments in the first time period by using the first maximum transmit power. The plurality of sending moments in the first time period may include the first moment.

In an embodiment, the communication apparatus 800 is alternatively applicable to the communication system shown in FIG. 1, and performs functions of the secondary node in the communication method shown in FIG. 6. The secondary node is configured to manage the SCG.

The processing module 801 is configured to control the transceiver module 802 to interact with a terminal device, to resume the suspended SCG for the terminal device.

In an embodiment, the processing module 801 is further configured to resume transmission between the terminal device and the SCG on a split signaling radio bearer SRB1 and/or a signaling radio bearer SRB3.

Optionally, the transceiver module 802 is further configured to accept a random access request initiated by the terminal device. The random access request is used to resume the SCG.

In an embodiment, the transceiver module 802 is further configured to receive second indication information from the terminal device, and send the second indication information to a master node. The master node is configured to manage a master cell group MCG for the terminal device, and the second indication information is used to indicate a link problem occurring in the MCG or indicate that a link problem occurs in the MCG.

Optionally, the second indication information may be included in a first message for transmission. The first message may be an MCG failure message, or another message including an MCG failure message.

Further, the transceiver module 802 is further configured to receive a response message for the first message from the master node, and send the response message for the first message to the terminal device. The response message for the first message may be an RRC reconfiguration message or an RRC release message. The RRC reconfiguration message is used to indicate the terminal device to resume the MCG, and the RRC release message is used to indicate the terminal device to release an RRC connection. Optionally, the RRC reconfiguration message may be further used to indicate the terminal device to suspend the SCG.

In an embodiment, the transceiver module 802 is further configured to receive a signal from the terminal device in a first time period. The first time period includes a time period in which the terminal device sends a signal to the MCG based on a time division multiplexing pattern between the MCG and the SCG and a time period in which the terminal device sends a signal to the SCG based on the time division multiplexing pattern.

Optionally, the transceiver module 802 is further configured to receive the signal from the terminal device from a first moment. The first moment is an earliest sending moment in a plurality of sending moments in the first time period.

In still another embodiment, the communication apparatus 800 is alternatively applicable to the communication system shown in FIG. 1, and performs functions of the master node in the communication method shown in FIG. 6. The master node is configured to manage the MCG.

The transceiver module 802 is configured to receive second indication information from a terminal device by using a secondary node. The secondary node is configured to manage a secondary cell group SCG, and the second indication information is used to indicate a link problem occurring in the MCG or indicate that a link problem occurs in the MCG.

The processing module 801 is configured to resume the MCG.

Optionally, the second indication information may be included in a first message for transmission. The first message may be an MCG failure message, or another message including an MCG failure message. This is not limited in this embodiment of this application.

Further, the transceiver module 802 is further configured to send a response message for the first message to the terminal device via the secondary node. The response message for the first message is an RRC reconfiguration message or an RRC release message. The RRC reconfiguration message is used to indicate the terminal device to resume the MCG, and the RRC release message is used to indicate the terminal device to release an RRC connection. Optionally, the RRC reconfiguration message may be further used to indicate the terminal device to suspend the SCG.

In an embodiment, the transceiver module 802 is further configured to receive a signal from the terminal device in a first time period via the secondary node. The first time period includes a time period in which the terminal device sends a signal to the MCG based on a time division multiplexing pattern between the MCG and the SCG and a time period in which the terminal device sends a signal to the SCG based on the time division multiplexing pattern.

Optionally, the communication apparatus 800 shown in FIG. 8 may further include a storage module (not shown in FIG. 8). The storage module stores a program or instructions. When the processing module 801 executes the program or the instructions, the communication apparatus 800 may perform the functions of the terminal device, the secondary node, or the master node in the communication method shown in FIG. 6.

In addition, for technical effects of the communication apparatus 800, refer to technical effects of the communication method shown in FIG. 3. Details are not described herein again.

An embodiment of this application provides a communication apparatus. The communication apparatus is configured to perform the communication method described in the foregoing method embodiment.

An embodiment of this application provides a communication apparatus. The communication apparatus includes a processor. The processor is configured to perform the communication method described in the foregoing method embodiment.

An embodiment of this application provides a chip system. The chip system includes a processor and an input/output port. The processor is configured to implement a processing function in the foregoing method embodiment, and the input/output port is configured to implement a transceiver function in the foregoing method embodiment.

In an embodiment, the chip system may further include a memory. The memory is configured to store program instructions and data for implementing functions in the foregoing method embodiment.

The chip system may include a chip, or may include a chip and another discrete component.

An embodiment of this application provides a communication system. The system includes the foregoing terminal device, the secondary node, and the master node. For details, refer to the embodiment of the communication system shown in FIG. 1. Details are not described herein again.

An embodiment of this application provides a computer-readable storage medium. The computer-readable storage medium includes a computer program or instructions. When the computer program or the instructions is/are run on a computer, the computer is enabled to perform the communication method in the foregoing method embodiment.

An embodiment of this application provides a computer program product, including a computer program or instructions. When the computer program or the instructions is/are run on a computer, the computer is enabled to perform the communication method in the foregoing method embodiment.

It should be understood that, the processor in embodiments of this application may be a central processing unit (CPU), or may be another general-purpose processor, a digital signal processor (DSP), an application-specific integrated circuit (ASIC), a field programmable gate array (FPGA) or another programmable logic device, a discrete gate or a transistor logic device, a discrete hardware component, or the like. The general-purpose processor may be a microprocessor, or the processor may be any conventional processor or the like.

It may be understood that the memory in embodiments of this application may be a volatile memory or a nonvolatile memory, or may include a volatile memory and a nonvolatile memory. The nonvolatile memory may be a read-only memory (ROM), a programmable read-only memory (PROM), an erasable programmable read-only memory (EPROM), an electrically erasable programmable read-only memory (EEPROM), or a flash memory. The volatile memory may be a random access memory (RAM), used as an external cache. Through an example rather than a limitative description, random access memories (RAM) in many forms may be used, for example, a static random access memory (SRAM), a dynamic random access memory (DRAM), a synchronous dynamic random access memory (SDRAM), a double data rate synchronous dynamic random access memory (DDR SDRAM), an enhanced synchronous dynamic random access memory (ESDRAM), a synchlink dynamic random access memory (SLDRAM), and a direct rambus random access memory (DR RAM).

All or some of the foregoing embodiments may be implemented using software, hardware (for example, circuit), firmware, or any combination thereof. When software is used to implement embodiments, the foregoing embodiments may be implemented completely or partially in a form of a computer program product. The computer program product includes one or more computer instructions or computer programs. When the program instructions or the computer programs are loaded and executed on the computer, the procedure or functions according to embodiments of this application are all or partially generated. The computer may be a general-purpose computer, a dedicated computer, a computer network, or other programmable apparatuses. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, infrared, radio, and microwave, or the like) manner. The computer-readable storage medium may be any usable medium accessible by a computer, or a data storage device, such as a server or a data center, integrating one or more usable media. The usable medium may be a magnetic medium (for example, a floppy disk, a hard disk, or a magnetic tape), an optical medium (for example, a DVD), or a semiconductor medium. The semiconductor medium may be a solid-state drive.

It should be understood that the term "and/or" in this specification describes only an association relationship between associated objects and represents that three relationships may exist. For example, A and/or B may represent the following three cases: Only A exists, both A and B exist, and only B exists. A and B may be singular or plural. In addition, the character "/" in this specification generally indicates an "or" relationship between the associated objects, or may indicate an "and/or" relationship. A meaning depends on a context.

In this application, "at least one" means one or more, and "a plurality of" means two or more. "At least one of the following items (pieces)" or a similar expression thereof refers to any combination of these items, including any combination of singular items (pieces) or plural items (pieces). For example, at least one item (piece) of a, b, and c may indicate: a, b, c, a and b, a and c, b and c, or a, b, and c, where a, b, and c may be singular or plural.

It should be understood that sequence numbers of the foregoing processes do not mean execution sequences in various embodiments of this application. The execution sequences of the processes should be determined according to functions and internal logic of the processes, and should not be construed as any limitation on the implementation processes of embodiments of this application.

A person of ordinary skill in the art may be aware that, in combination with the examples described in embodiments disclosed in this specification, units and algorithm steps may be implemented by electronic hardware or a combination of computer software and electronic hardware. Whether the functions are performed by hardware or software depends on particular applications and design constraint conditions of the technical solutions. A person skilled in the art may use different methods to implement the described functions for each particular application, but it should not be considered that the implementation goes beyond the scope of this application.

It may be clearly understood by a person skilled in the art that, for the purpose of convenient and brief description, for a detailed working process of the foregoing system, apparatus, and unit, refer to a corresponding process in the foregoing method embodiments, and details are not described herein again.

In the several embodiments provided in this application, it should be understood that the disclosed system, apparatus, and method may be implemented in other manners. For example, the described apparatus embodiment is merely an example. For example, division into the units is merely logical function division and may be other division in actual implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. Some or all of the units may be selected based on actual requirements to achieve the objectives of the solutions of embodiments.

In addition, function units in embodiments of this application may be integrated into one processing unit, each of the units may exist alone physically, or two or more units may be integrated into one unit.

When the functions are implemented in the form of a software functional unit and sold or used as an independent product, the functions may be stored in a computer-readable storage medium. Based on such an understanding, the technical solutions of this application essentially, or the part contributing to the prior art, or some of the technical solutions may be implemented in a form of a software product. The software product is stored in a storage medium, and includes several instructions for instructing a computer device (which may be a personal computer, a server, or a network device) to perform all or some of the steps of the methods described in embodiments of this application. The foregoing storage medium includes any medium that can store program code, such as a USB flash drive, a removable hard disk, a read-only memory (ROM), a random access memory (RAM), a magnetic disk, or an optical disc.

The foregoing descriptions are merely implementations of this application, but are not intended to limit the protection scope of this application. Any variation or replacement readily figured out by a person skilled in the art within the technical scope disclosed in this application shall fall within the protection scope of this application. Therefore, the protection scope of this application shall be subject to the protection scope of the claims.

What is claimed is:

1. A communication method performed by a terminal device or a chip system of the terminal device, wherein the method comprises:
when detecting a link problem occurs in a master cell group (MCG) or a signal quality of the MCG is less than a signal quality threshold,
resuming a secondary cell group (SCG) that is suspended before detecting the link problem occurs in the MCG or the signal quality of the MCG is less than the signal quality threshold, wherein the resuming comprises: determining that a maximum transmit power used by the terminal device to send a signal to the SCG is a first maximum transmit power, wherein the first maximum transmit power is greater than a second maximum transmit power that is a maximum transmit power used by the terminal device to send a signal to the SCG before the SCG is suspended;
the MCG being managed by a master node, and the SCG being managed by a secondary node.

2. The communication method according to claim 1, wherein the resuming the SCG comprises one or more of the following:
resuming transmission with the SCG on a split signaling radio bearer (SRB1) and/or a signaling radio bearer (SRB3);
activating a part or all of deactivated cells in the SCG;
waking up a part or all of cells that are in a dormant state in the SCG;
stopping discontinuous reception and/or discontinuous transmission performed in a part or all of cells in the SCG;
resuming signaling transmission in the SCG; or
resuming data transmission in the SCG.

3. The communication method according to claim 1, wherein the terminal device comprises a radio resource control (RRC) layer entity and a packet data convergence protocol (PDCP) layer entity, and the communication method further comprises:
sending, by the RRC layer entity of the terminal device, first indication information to the PDCP layer entity of the terminal device, wherein the first indication information indicates to resume the SCG.

4. The communication method according to claim 1, wherein the communication method further comprises:
sending second indication information to the master node via the secondary node, wherein the second indication information indicates the link problem occurring in the MCG or indicates the link problem occurs in the MCG.

5. The communication method according to claim 4, wherein the second indication information is included in a first message, wherein the communication method further comprises:
receiving a response message for the first message from the master node via the secondary node, wherein the response message for the first message is a radio resource control (RRC) reconfiguration message or a RRC release message.

6. The communication method according to claim 1, wherein the communication method further comprises:
sending a signal to the SCG in a first time period, wherein the first time period comprises a time period in which the terminal device sends a signal to the MCG based on a time division multiplexing pattern between the MCG and the SCG and a time period in which the terminal device sends the signal to the SCG based on the time division multiplexing pattern.

7. The communication method according to claim 6, wherein the sending the signal to the SCG in a first time period comprises:
sending the signal to the SCG from a first moment, wherein the first moment is an earliest sending moment in a plurality of sending moments in the first time period.

8. A communication method, the method comprising:
resuming, by a secondary node for a terminal device, a secondary cell group (SCG) that is configured to the terminal device for communications and suspended, the secondary node being configured to manage the SCG; and
receiving, by the secondary node, second indication information from the terminal device, and sending the second indication information to a master node, the master node being configured to manage a master cell group (MCG) for the terminal device, and the second indication information indicates a link problem occurring in the MCG or indicates that a link problem occurs in the MCG, wherein during the process of resuming the SCG, the secondary node receives a first signal sent by the terminal device to the SCG based on a first maximum transmit power, wherein the first maximum transmit power is greater than a second maximum transmit power that is used by the terminal device to send a second signal to the SCG before the SCG is suspended.

9. The communication method according to claim 8, wherein the secondary node resuming the SCG for the terminal device comprises one or more of the following:
resuming, by the secondary node, transmission between the terminal device and the SCG on a split signaling radio bearer (SRB1) and/or a signaling radio bearer (SRB3);
activating, by the secondary node for the terminal device, a part or all of deactivated cells in the SCG;
waking up, by the secondary node for the terminal device, a part or all of cells that are in a dormant state in the SCG;
stopping, by the secondary node, discontinuous reception and/or discontinuous transmission performed by the terminal device in a part or all of cells in the SCG;
resuming, by the secondary node, signaling transmission of the terminal device in the SCG; or
resuming, by the secondary node, data transmission of the terminal device in the SCG.

10. The communication method according to claim 8, wherein the second indication information is included in a first message, wherein the method further comprises:
receiving, by the secondary node, a response message for the first message from the master node, and sending the response message for the first message to the terminal device;

wherein the response message for the first message is a radio resource control (RRC) reconfiguration message or a RRC release message.

11. The communication method according to claim 8, wherein the communication method further comprises:
receiving, by the secondary node, a signal from the terminal device in a first time period;
wherein the first time period comprises a time period in which the terminal device sends a signal to the MCG based on a time division multiplexing pattern between the MCG and the SCG and a time period in which the terminal device sends a signal to the SCG based on the time division multiplexing pattern.

12. A communication apparatus, comprising:
a non-transitory memory storing instructions; and
at least one processor in communication with the memory, the at least one processor configured, upon execution of the instructions, to perform the following steps:
when detecting a link problem occurs in a master cell group (MCG) or a signal quality of the MCG is less than a signal quality threshold, resume a secondary cell group (SCG) that is suspended before detecting the link problem occurs in the MCG or the signal quality of the MCG is less than the signal quality threshold, wherein the resuming comprises: determining that a maximum transmit power used by the terminal device to send a signal to the SCG is a first maximum transmit power, wherein the first maximum transmit power is greater than a second maximum transmit power that is a maximum transmit power used by the terminal device to send a signal to the SCG before the SCG is suspended, the MCG is managed by a master node, and the SCG is managed by a secondary node.

13. The communication apparatus according to claim 12, wherein the resuming the SCG comprises one or more of the following:
resuming transmission with the SCG on a split signaling radio bearer SRB1 and/or a signaling radio bearer (SRB3);
activating a part or all of deactivated cells in the SCG;
waking up a part or all of cells that are in a dormant state in the SCG;
stopping discontinuous reception and/or discontinuous transmission performed in a part or all of cells in the SCG;
resuming signaling transmission in the SCG; or
resuming data transmission in the SCG.

14. The communication apparatus according to claim 12, wherein the terminal device comprises a radio resource control (RRC) layer entity and a packet data convergence protocol (PDCP) layer entity, and wherein the at least one processor further executes the instructions to:
send, by the RRC layer entity of the apparatus, first indication information to the PDCP layer entity of the terminal device, wherein the first indication information indicates to resume the SCG.

15. The communication apparatus according to claim 12, wherein the at least one processor further executes the instructions to:
send second indication information to the master node via the secondary node, wherein the second indication information indicates the link problem occurring in the MCG or indicates the link problem occurs in the MCG.

16. The communication apparatus according to claim 15, wherein the second indication information is included in a first message, wherein the at least one processor further executes the instructions to:
receive a response message for the first message from the master node via the secondary node, wherein the response message for the first message is a radio resource control (RRC) reconfiguration message or a RRC release message.

17. The communication apparatus according to claim 12, wherein the at least one processor further executes the instructions to:
send a signal to the SCG in a first time period, wherein the first time period comprises a time period in which the terminal device sends a signal to the MCG based on a time division multiplexing pattern between the MCG and the SCG and a time period in which the terminal device sends a signal to the SCG based on the time division multiplexing pattern.

18. The communication apparatus according to claim 17, wherein the sending the signal to the SCG in the first time period comprises:
sending the signal to the SCG from a first moment, the first moment comprising an earliest sending moment in a plurality of sending moments in the first time period.

* * * * *